(12) United States Patent
Terada et al.

(10) Patent No.: US 7,797,554 B2
(45) Date of Patent: Sep. 14, 2010

(54) ORIGINAL DATA CIRCULATION METHOD, SYSTEM, APPARATUS, AND COMPUTER READABLE MEDIUM

(75) Inventors: Masayuki Terada, Yokosuka (JP); Ko Fujimura, Yokohama (JP); Hiroshi Kuno, Yokohama (JP); Masayuki Hanadate, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 12/317,212

(22) Filed: Dec. 18, 2008

(65) Prior Publication Data

US 2009/0125729 A1 May 14, 2009

Related U.S. Application Data

(62) Division of application No. 10/971,649, filed on Oct. 22, 2004, now Pat. No. 7,539,873, which is a division of application No. 09/504,070, filed on Feb. 14, 2000, now Pat. No. 7,249,102.

(30) Foreign Application Priority Data

| Feb. 17, 1999 | (JP) | .............................. | 1999-039080 |
| Sep. 1, 1999 | (JP) | .............................. | 1999-247457 |

(51) Int. Cl.
*G06F 11/30* (2006.01)
(52) U.S. Cl. ......................................... 713/194; 726/28
(58) Field of Classification Search ................. 713/194; 726/28

See application file for complete search history.

(56) References Cited

U.S. PATENT DOCUMENTS

| 5,260,999 A | 11/1993 | Wyman |
| 5,287,408 A | 2/1994 | Samson |
| 5,557,518 A * | 9/1996 | Rosen .......................... 705/69 |
| 5,621,797 A | 4/1997 | Rosen |
| 5,710,887 A | 1/1998 | Chelliah et al. |
| 5,822,434 A | 10/1998 | Caronni et al. |
| 5,892,900 A | 4/1999 | Ginter et al. |

FOREIGN PATENT DOCUMENTS

EP 0 369 551 5/1990

(Continued)

OTHER PUBLICATIONS

Amano et al., "Security Technology", Fujitsu, 48, 2, pp. 121-128, Mar. 10, 1997.

(Continued)

*Primary Examiner*—Jacob Lipman
(74) *Attorney, Agent, or Firm*—Kenyon & Kenyon LLP

(57) ABSTRACT

An original data circulation system for storing or circulating original data which is digital information is provided. The original data circulation system includes an issuer apparatus, a user apparatus and a collector apparatus. The issuer apparatus generates originality information including first information corresponding to the issuer apparatus and second information corresponding to data and sends the originality information. The user apparatus verifies the validity of the source apparatus of the originality information and stores the originality information when the validity is verified. The collector apparatus verifies the validity of the source apparatus of the originality information and processes data corresponding to the second information when the validity is verified.

2 Claims, 21 Drawing Sheets

FOREIGN PATENT DOCUMENTS

| | | |
|---|---|---|
| EP | 0 715 247 A1 | 6/1996 |
| EP | 0 288 160 | 10/1998 |
| EP | 0 897 226 A2 | 2/1999 |
| JP | 9-138827 | 5/1997 |
| JP | 10-63884 A | 3/1998 |
| JP | 10-260630 | 9/1998 |
| JP | 11-031204 A | 2/1999 |
| JP | 11-41231 A | 2/1999 |
| JP | 11-045507 | 2/1999 |
| JP | 2003/308865 | 9/2003 |
| JP | 2004-013914 | 1/2004 |
| WO | 93/08545 | 4/1993 |
| WO | 95/30211 | 11/1995 |
| WO | WO 98/37481 | 8/1998 |

OTHER PUBLICATIONS

Okamoto, "Illustrated Description, Cipher and Information Security", Nikkei BP, pp. 77-79, Jul. 25, 1998.

Hiroshi Kuno, Masayuki Terada, Makoto Iguchi, "Rights Trading System with Secure Deposit Storages," SCIS2000, Jan. 26, 2000.

Ko Fumimura and Yoshiaki Nakajima, "General-Purpose Digital Ticket Framework", Proceedings of the 3rd USENIX Workshop on Electronic Commerce, Aug. 1998.

Kazuo Matsuyama and Ko Fujimura, "Distributed Digital-Ticket Management for Rights Trading System", 1st ACM Conference on Electronic Commerce, Nov. 1999.

Ko Fumimura, Hiroshi Kuno, Masayuki Terada, Kazuo Matsuyama, Yasunao Mizuno and June Sokine "Digital Ticket Controlled Digital Ticket Circulation", Proceedings of the 8th USENIX Security Symposium, Aug. 1999.

Hiroshi Kuno, Kazuo Matsuyama, Ko Fumimura, "A Digital Ticket Circulation Architecture", 58th IPSJ National Convention, Mar. 1999.

Yoshiaki Nakajima, Ko Fujimura, Jun Sekine, "A Ticket Definition Language for Rights Trading Infrastructure", Computer Security Symposium (CSS '99), Oct. 1999.

Masayuki Terada, Hiroshi Kuno, Masayuki Hanadate, "A Copy Prevention Method for Rights Trading Infrasctructure" Computer Security Symposium (CSS '99), Oct. 1999.

Ford, Warwick et al. "Secure Electronic Commerce: Building the Infrastructure for Digital Signatures and Encryption", Prentice Hall PTR, Prentice-Hall, Inc., pp. 90-97, 1997.

Hideki Imai, et al., "Network system and encryption, risk management in digitized society", Computer Today No. 86, Science-sha, Jul. 1, 1998, pp. 4-9 (especially, refer to description on distribution of public key (signature verification key) in p. 6).

Alfred J. Manezes et al., Handbook of Applied Cryptography, 1997, CRC Press LLC, pp. 321, 322, 559-560.

Alfred J. Manezes et al., Handbook of Applied Cryptography, 1997, CRC Press LLC, pp. 321, 322, 559.

Ko Fujimura and Yoshiaki Nakajima and Jun Sekine, "XML Ticket: Generalized Digital Ticket Definition Language", W3C XML-Dsig '99, Apr. 1999.

Japanese Office Action, dated Apr. 11, 2006.

Austrian Patent Office—Examination and Search Report for Application No. 20000793-0.

European Search Report dated Mar. 3, 2009 issued in corresponding European Application No. 08 170 878.6.

* cited by examiner

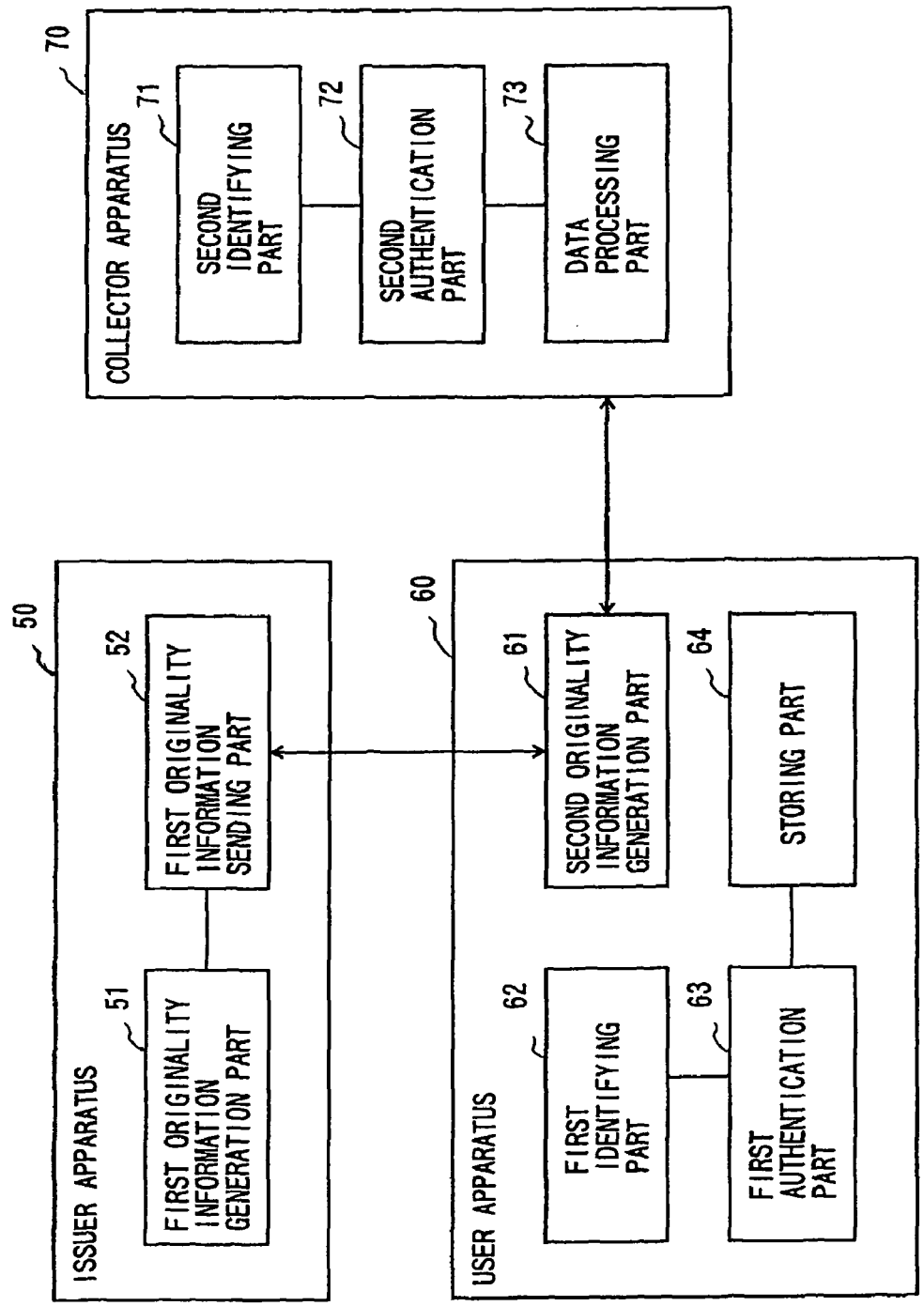

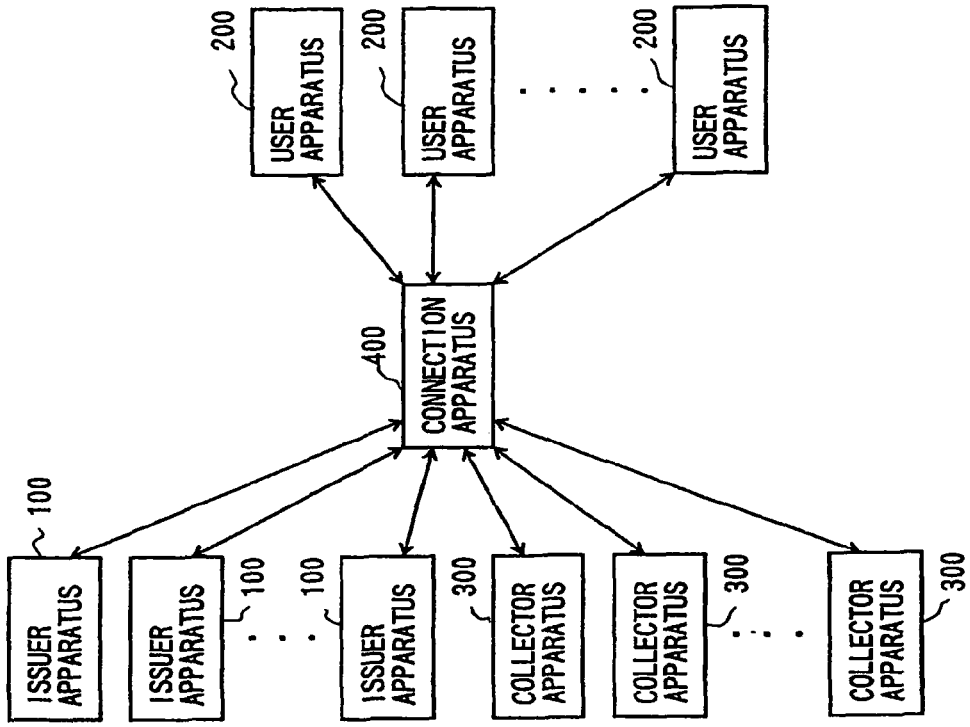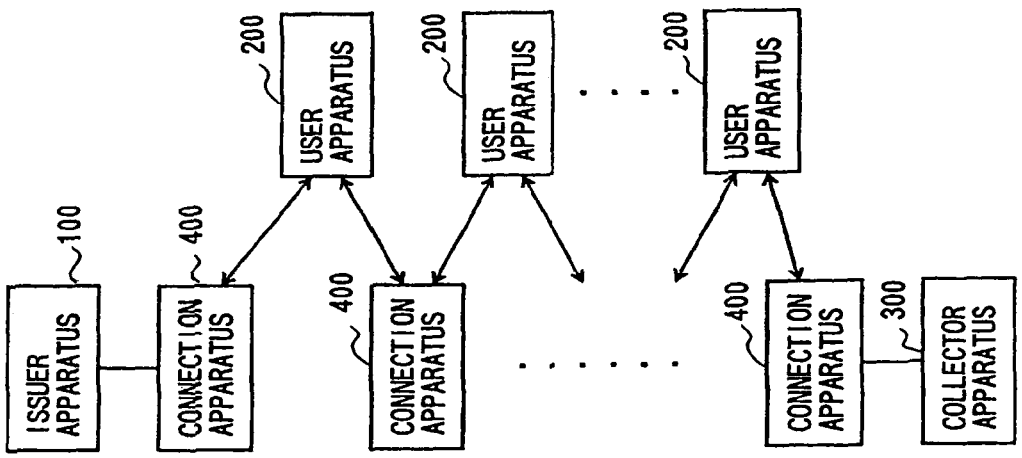

ORIGINAL DATA CIRCULATION METHOD, SYSTEM, APPARATUS, AND COMPUTER READABLE MEDIUM

RELATED/PRIORITY APPLICATION INFORMATION

This application claims the benefit and priority of and is a division of U.S. patent application Ser. No. 10/971,649, filed Oct. 22, 2004, now U.S. Pat. No. 7,539,873 which is a division of U.S. patent application Ser. No. 09/504,070, filed Feb. 14, 2000, now U.S. Pat. No. 7,249,102 which claims foreign priority benefits under 35 U.S.C. §119 of Japanese Patent Application No. 11-39080, filed Feb. 17, 1999 and Japanese Patent Application No. 11-247457, filed. Sep. 1, 1999, all of which are incorporated herein by reference.

BACKGROUND OF THE INVENTION

1. Field of the Invention

The present invention generally relates to an original data circulation method, system apparatus, and computer readable medium. More particularly, the present invention relates to providing technologies for storing and distributing data such as a digital ticket which represents a digital right, digital contents and the like, in which the number of valid reproductions of such data needs to be smaller than a defined number.

2. Description of the Related Art

Reproductions of data or a digital ticket which represents a digital right exceeding the number which the data distributor intends should be prevented. That is, distributed data that is reproduced by a user illegally should be prevented.

Conventionally, such multiple use is prevented by technologies described in the following.

A first method is that transfer histories of the original data are attached to the data and they are used to check whether the data is already used or not at the time of request for exercising the right. If the right is already used up, the service provider (or collector) of the data refuses accepting the right represented by the data.

A second method is to store the data in a tamper-proof device such that the data cannot be accessed except via the tamper-proof device. When the data is used up, the data is deleted from the tamper-proof device.

According to the above-mentioned first method, a special device such as the tamper-proof device is not necessary. However, a problem comes up when the data is circulated. More specifically, validity of the data can be checked only when the right is exercised according to the first method. Therefore, there is a problem that the validity of the data can not be judged while the data is circulating.

According to the above-mentioned second method, uniqueness of the data can be protected by using the tamper-proof device. In addition, methods which are described in Japanese patent application No. 6-503913 or Japanese laid-open patent application No. 9-511350 can be used together with the above-mentioned second method, in which a plurality of tamper-proof devices are connected via secure communication routes which are protected by cryptography. The data is exchanged via the communication routes such that the data can be circulated while preventing reproduction of the data. However, the technology has the following two problems since the data needs to be stored in the tamper-proof device.

First, it becomes impossible to view the description of the data. Therefore, there is a constraint that all checks such as a check of the validity period of the description should be left to the tamper-proof device.

In addition, since the tamper-proof device should not only have a storing part of the data but also carry out all processing necessary for handling the data, a large storage capacity and a high processing throughput are required for the tamper-proof device. Especially, an IC card which is generally used for the tamper-proof device does not have enough storage capacity or processing throughput.

SUMMARY OF THE INVENTION

It is an object of the present invention to provide an original data circulation method, a system, an apparatus and a computer readable medium in which it is ensured that the number of valid reproductions of data is maintained below a specified number. In addition, the tamper-proof device does not necessarily perform all verifications other than the verification on reproducing such that processing load such as processing throughput or memory capacity can be decreased.

The above object of the present invention is achieved by an original data circulation system for storing or circulating original data which is digital information, the system comprising:

an apparatus including: an arrangement for generating first information corresponding to an issuer apparatus for issuing data; an arrangement for sending the first information; and an arrangement for sending second information corresponding to the data; and an apparatus including: an arrangement for verifying validity of the first information which is received; an arrangement for verifying that an issuing apparatus corresponding to valid first information is valid; and an arrangement for determining that data corresponding to the second information is valid when the issuer apparatus is valid.

The first information may be, for example, after-mentioned H(PkI) or the like. The second information may be a hash value of data or a hash value of data with a signature. The issuer apparatus is determined to be valid, for example, when the source apparatus of the first information and an apparatus corresponding to the first information are the same. Since a tamper-proof apparatus and the like performs an authentication process using the first information, the above-mentioned problem is solved and the processing load can be decreased.

The above object of the present invention is also achieved by a data storing method of storing digital information which has a value, comprising the steps of:

generating third information which is digital information with a signature signed by an issuer apparatus for the digital information;

generating, by the issuer apparatus, fourth information, the fourth information being a manifest corresponding to the digital information;

verifying, by an user apparatus, identity of the issuer apparatus by using the third information and the fourth information; and preventing reproduction of the digital information.

The fourth information may be, for example, a hash value of the data with the signature. The hash value is the manifest which corresponds to originality information. The originality information is information which represents genuineness of the right of data. In other words, the originality information represents the authenticity or originality of data.

According to the above-mentioned invention, data and the signature of the data are stored and a manifest which is information in one-to-one correspondence with the data and the signature. In addition, the signer who generates the signature is identified and it is verified that the signer is the same as the party which intends to store the manifest. Thus, the number of manifests which the signer intends are stored in the data storing system.

The data storing method may further comprise the steps of:
verifying identity of the issuer apparatus by storing the fourth information in a tamper-proof device; and
preventing reproduction of the digital information.

Accordingly, the data can be stored in an apparatus other than the data storing system since the tamper-proof device is used.

The above object of the present invention is also achieved by a data storing system for storing digital information which has a value, comprising:
an issuer apparatus for generating third information which is digital information with a signature and generating the fourth information which is a manifest corresponding to the digital information; and
a user apparatus for verifying identity of the issuer apparatus by using the third information and the fourth information; and
preventing reproduction of the digital information.

The above object of the present invention is also achieved by a user apparatus for using digital information in a data storing system for storing digital information which has a value, comprising:
a first storing arrangement for storing and extracting digital information with a signature;
a second storing arrangement for storing and extracting a manifest corresponding to digital information;
a first authentication arrangement for verifying that the manifest is valid; and
a first control arrangement for storing the manifest in the second storing arrangement only when the first authentication arrangement verifies that the manifest is valid.

Accordingly, by determining that the data is valid only when the manifest corresponding to the data is stored in the data storing system, having valid data exceeding the number of manifests that exist can be avoided.

The above object of the present invention is also achieved by an issuer apparatus for issuing digital information in a data storing system for storing digital information which has a value, the issuer apparatus comprising:
an accredited information generation arrangement for generating accredited information which includes a set of information representing an accredited object trusted by the signer of the digital information;
a signature arrangement for providing a signature to the digital information and to the accredited information;
a manifest generation arrangement for generating the manifest;
an arrangement for sending the digital information and the accredited information to a user apparatus;
an arrangement for receiving session information which includes a verification key of the user apparatus and a serial number; and
an arrangement for sending information including the manifest and the session information by using a verification key and a signature function of the issuer apparatus.

Accordingly, there is an accredited object trusted by the signer of the data and a signature signed by the issuer apparatus. It is verified that the signer of the manifest is included in the accredited objects or in the signers trusted by the accredited object. In addition, it is verified that the signer of the accredited information and the signer of the data are the same. Accordingly, the manifest can be transmitted only via a route trusted by the signer of the data. At the time, the tamper-proof capability is assured by using the tamper-proof apparatus.

The above object of the present invention is also achieved by a collector apparatus for exercising a right of digital information in a data storing system for storing digital information which has a value, the collector apparatus comprising:
an arrangement for receiving digital information with a signature of the issuer and accredited information with the signature from a user apparatus;
an arrangement for generating session information which has uniqueness in the data storing system and sending the session information to the user apparatus;
an arrangement for receiving information including the manifest and the session information from the user apparatus; and
an arrangement for verifying that the session information, the manifest and the accredited information are valid.

Accordingly, by generating and storing the session information, it becomes possible to avoid the manifest being stored in a plurality of storing parts without using an encrypted route. In addition, it becomes possible to send a plurality of manifests to a storing part in parallel.

The above-mentioned inventions will be described in the first embodiment in detail. In addition, the following inventions will be described in the second embodiment in detail.

The above object of the present invention is also achieved by an original data circulation method in an original data circulation system for storing or circulating original data which is digital information, the method comprising:
a sending step of sending, by a first apparatus, originality information, the originality information including fifth information which corresponds to an apparatus and sixth information which is data or information corresponding to the data; and
an identifying step of identifying, by a second apparatus, the source apparatus of the originality information;
a first authentication step of determining that the originally information is valid when the source apparatus is authenticated; and
a second authentication step of determining that the originality information is valid only when the source apparatus and an apparatus corresponding to the fifth information of the originality information are the same.

The above object of the present invention is also achieved by an original data circulation system for storing or circulating original data which is digital information, the system comprising:
a first apparatus which includes a sending arrangement for sending originality information, the originality information including fifth information which corresponds to an apparatus and sixth information which is data or information corresponding to the data; and
a second apparatus which includes:
an identifying arrangement for identifying a source apparatus of the originality information;
a first authentication arrangement for determining that the originally information is valid when the source apparatus is authenticated; and
a second authentication arrangement for determining the originality information is valid only when the source apparatus and an apparatus corresponding to the fifth information of the originality information are the same.

The above-mentioned originality information will be called token in the second embodiment. The fifth information may be, for example, a hash value of a verification key (public key) of an apparatus. The sixth information may be, for example, a hash value of the data. According to the above-mentioned invention, since the second authentication arrangement determines that the originality information is valid only when the source apparatus and an apparatus corresponding to the first information are the same, the conventional problem can be solved. In addition, since it is not necessary to circulate the signature, the processing load can be further decreased.

The above object of the present invention is also achieved by an issuer apparatus in an original data circulation system for storing or circulating original data which is digital information, the issuer apparatus comprising:

an originality information generation arrangement for generating originality information which includes fifth information corresponding to the issuer apparatus and sixth information corresponding to data or information corresponding to the data; and an originality information sending arrangement for sending the originality information.

The above object of the present invention is also achieved by a user apparatus in an original data circulation system for storing or circulating original data which is digital information, the user apparatus comprising:

an originality information sending arrangement for sending originality information which includes fifth information corresponding an apparatus and sixth information corresponding to data or information corresponding to the data;

an identifying arrangement for identifying a source apparatus of the originality information which is sent from an apparatus;

an authentication arrangement for determining that the originality information is valid when the source apparatus is authenticated or when the apparatus corresponding to the fifth information and the source apparatus are the same; and a storing arrangement for storing the originality information when the authentication arrangement determines that the originality information is valid.

The above object of the present invention is also achieved by a collector apparatus in an original data circulation system for storing or circulating original data which is digital information, the collector apparatus comprising:

an identifying arrangement for identifying a source apparatus of originality information;

an authentication arrangement for authenticating the source apparatus; and a data processing arrangement for performing a process corresponding to the data or data corresponding to the sixth information when the authentication arrangement determines that the originality information which is sent to the collector apparatus is valid.

In the present invention, since accredited information which represents a trusted third party may be used, the originality information can be circulated between trusted parties.

The above object of the present invention is also achieved by an original data circulation system for storing or circulating original data which is digital information, the original data circulation system comprising:

an issuer apparatus including:

a first originality information generation arrangement for generating originality information which includes fifth information corresponding to the issuer apparatus and sixth information corresponding to data or information corresponding to the data; and a first originality information sending arrangement for sending the originality information;

a user apparatus including:

a first originality information sending arrangement for sending originality information which includes fifth information corresponding to an apparatus and sixth information corresponding to data or information corresponding to the data;

a first identifying arrangement for identifying a source apparatus of the originality information which is sent from an apparatus;

a first authentication arrangement for determining that the originality information is valid when the source apparatus is authenticated or when the apparatus corresponding to the fifth information and the source apparatus is the same; and a storing arrangement for storing the originality information when the first authentication arrangement determines that the originality information is valid; and a collector apparatus including:

a sixth identifying arrangement for identifying a source apparatus of originality information;

a sixth authentication arrangement for authenticating the source apparatus; and a data processing arrangement for performing a process corresponding to the data or data corresponding to the sixth information when the second authentication arrangement determines that the originality information which is sent to the collector apparatus is valid.

Accordingly, it becomes possible to issue a ticket, transfer the ticket, consume and present the ticket in the above apparatuses.

BRIEF DESCRIPTION OF THE DRAWINGS

Other objects, features and advantages of the present invention will become more apparent from the following detailed description when read in conjunction with the accompanying drawings, in which:

FIG. 11 is a diagram for describing a principle according to a second embodiment of the present invention;

FIGS. 12A and 12B are block diagrams of a data storing system in an original data circulation system according to the second embodiment of the present invention;

DETAILED DESCRIPTION OF THE PREFERRED EMBODIMENTS

First Embodiment

First, a data storing system as an original data circulation system of the present invention will be described.

Figure 1:
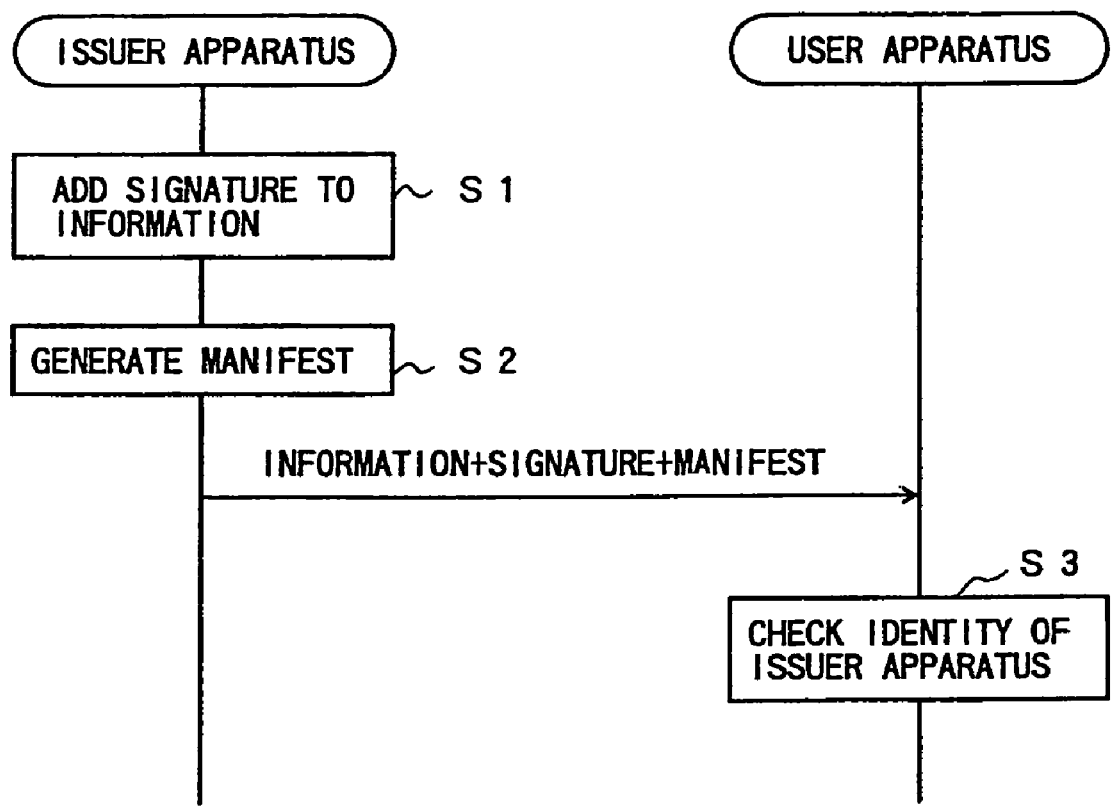
FIG. 1 is a diagram for describing a principle according to a first embodiment of the present invention.

FIG. 1 is a diagram for describing a principle of the present invention. In the data storing system of the present invention, an issuer apparatus of digital information generates first information by adding a digital signature to the digital information in step 1. The issuer apparatus generates second information which is a manifest corresponding to the digital information and adds the second information to the first information in step 2. A user apparatus checks the identity of the issuer apparatus by using the first information and the second information such that the unauthorized reproduction of the digital information can be prevented in step 3.

In the first embodiment, a digital ticket that is a digital representation of a right to claim services or goods, are used as an example of digital information to be circulated.

Figure 2:
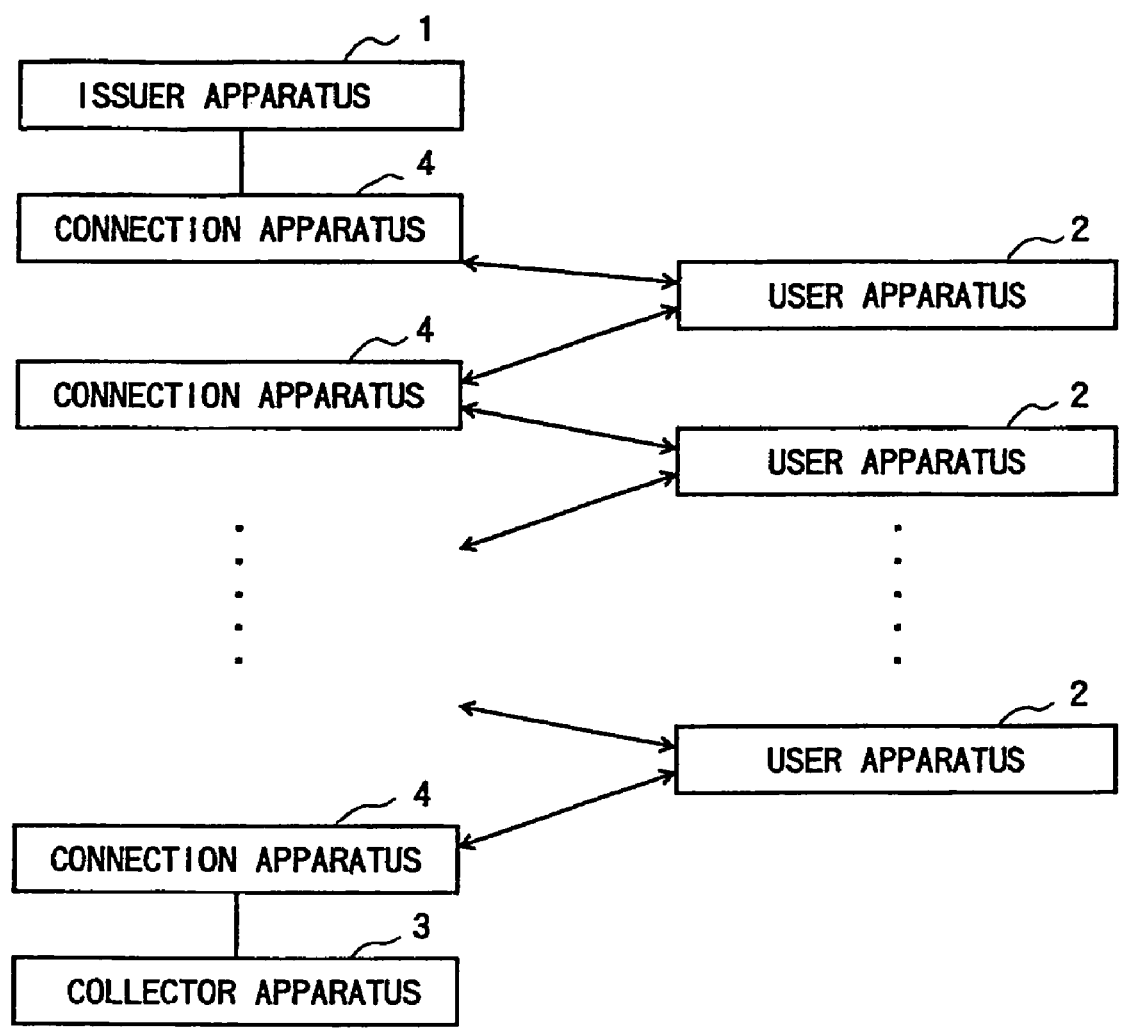
FIG. 2 is a block diagram of a data storing system according to the first embodiment of the present invention.

FIG. 2 shows a block diagram of the data storing system. As shown in the figure, an issuer issues a digital ticket. Then, the user transfers the digital ticket to another user. When a user who receives the digital ticket uses the digital ticket, a verifier verifies validity of the digital ticket.

In the figure, the issuer of the digital ticket has an issuer apparatus 1 and the user who receives the digital ticket has a user apparatus 2. When issuing a digital ticket, a communication channel between the issuer apparatus 1 and the user apparatus 2 is established via a connection apparatus 4. The communication channel may exist only during the period from the issuing start time to the issuing end time.

When transferring the digital ticket, a communication channel is established between the user apparatuses 2 via the communication apparatus 4 in the same way as when issuing the digital ticket. Then, the digital ticket is transferred between the user apparatuses 2. A collector of the digital tickets has a collector apparatus 3. When collecting the digital tickets, a communication channel is established between the user apparatus 2 and the collector apparatus 3 via the communication apparatus 4 in the same way as when issuing the digital ticket. Then, the digital ticket is sent to the collector apparatus 3.

As mentioned above, the data storing system of the present invention includes one or a plurality of issuer apparatuses, one or a plurality of user apparatuses 2 and one or a plurality of collector apparatuses 3 which apparatuses are connected by connection apparatuses 4 which provide temporal communication channels.

In the following, each of the apparatuses which are included in the data storing system will be described. Before the description, meanings of formulas which will be used for the description will be described.

x.y means concatenation of x and y. H means a unidirectional hash function. The hash function has the property that determining x from y which satisfies y=H(x) is difficult. MD5 of RSA is known as a hash function.

$S_{Pk}$ is a signature function which generates a digital signature which can be verified by a verification function $V_{Pk}$. The verification function $V_{Pk}$ has the property of $V_{Pk}(x \cdot S_{Pk}(x))=1$, $V_{Pk}(x \cdot \text{other})=0$ ($\text{other} \cdot S_{Pk}(x)$). That is, the verification function $V_{Pk}$ can verify that information x has a signature signed by the signature function $S_{Pk}$. In addition, the verification function $V_{Pk}$ can verify that the digital signature $S_{Pk}(x)$ is a correct signature signed by $S_{Pk}$ for x.

Pk is a verification key and has the property that $V_{Pk}$ can be formed by providing the verification key Pk to a verifier V. Especially, a verification key $Pk2 \cdot S_{Pk1}(Pk2)$ is called as a key certificate of Pk2 by Pk1.

ESIGN of Nippon Telegraph and Telephone Corporation is known as a digital signature method which realizes the above-mentioned $S_{Pk}$ and $V_{Pk}$.

Figure 3:
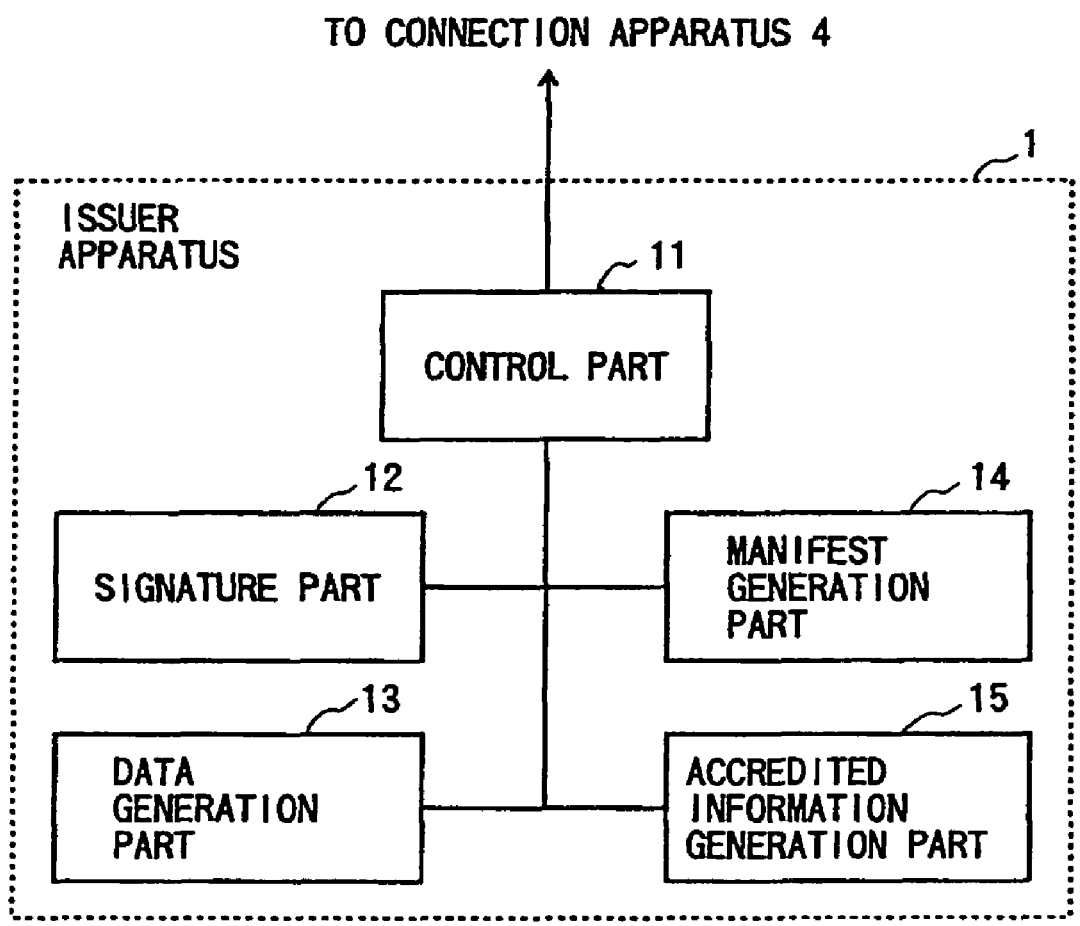
FIG. 3 is a block diagram of an issuer apparatus of the data storing system according to the first embodiment of the present invention.

FIG. 3 shows an issuer apparatus according to an embodiment of the present invention.

The issuer apparatus 1 shown in the figure includes a control part 11, a signature part 12, a data generation part 13, a manifest generation part 14 and an accredited information generation part 15.

The control part 11 has a verification key PkI and controls the issuer apparatus 1 to circulate a digital ticket securely. PkI is a verification key corresponding to a signature function $S_{PkI}$ provided in the signature part 12. A detailed description on the control part 11 will be given later.

The signature part 12 includes the signature function $S_{PkI}$. Each issuer apparatus has a different signature function $S_{PkI}$. The signature function $S_{PkI}$ is concealed by the signature part 12.

The data generation part 13 generates data m on the basis of information generated in the issuer apparatus 1 or information given from the outside. According to the data storing system of the present invention, there is no restriction for the contents of the data m. Therefore, digital information representing rights of general tickets such as a concert ticket, program data, music data and image data can be used as the data m.

In addition, m can be formed as relation to other data or as data including relation to other data by obtaining $H(m_0)$ in which $m_0$ is provided from the outside. Accordingly, data amount sent to an after-mentioned tamper-proof device 28 can be decreased when issuing a digital ticket.

The manifest generation part 14 has the unidirectional hash function H and generates a manifest $c_{(m, PkI)} = H(m \cdot S_{PkI}(m))$ of data with a signature $m \cdot S_{PkI}(m)$.

The accredited information generation part 15 generates accredited information $t = (t_I, t_c)$. In the accredited information $t = (t_I, t_c)$, $t_I = PkI$, $t_c = \{H(PkC_1), H(PkC_2), \ldots, H(PkC_n)\}$. Here, PkI is a verification key held by the control part 11, and $PkC_i$ is a verification key for verifying a signature signed by an after-mentioned third party which is "trusted" by the issuer.

Figure 4:
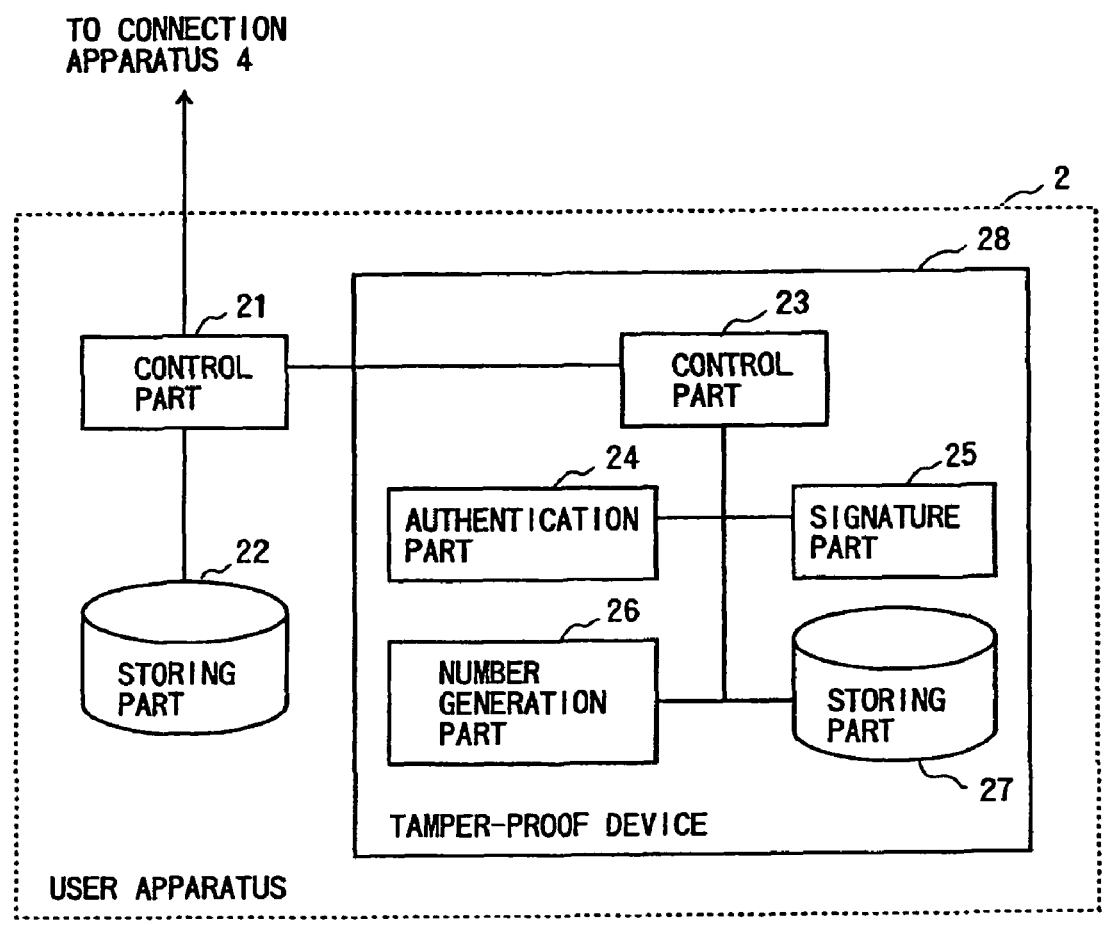
FIG. 4 is a block diagram of a user apparatus of the data storing system according to the first embodiment of the present invention.

FIG. 4 is a user apparatus 2 according to an embodiment of the present invention. The user apparatus 2 includes a control part 21, a storing part 22 and the tamper-proof device 28 which has a control part 23, an authentication part 24, a signature part 25, a number generation part 26 and a storing part 27. The tamper-proof device 28 protects functions and contents of the parts from tampering. Even the user of the tamper-proof device 28 can not tamper with the tamper-proof device 28. An IC card or a server which is stringently managed by a third party via a network can be used as the tamper-proof device 28.

The control part 21 and the control part 23 in the tamper-proof device 28 control the user apparatus 2 for circulating a digital ticket securely. The detailed description of the control part 21 will be described later.

The storing part 22 stores a set $M_u$ of data with a signature which is held by the user and a set $T_u$ of accredited information with a signature signed by an issuer. The sets can be updated by the control part 21.

The control part 23 has verification keys PkU and PkC, and a key certificate $PkU \cdot S_{PkC}(PkU)$. Here, the verification key PkU corresponds to $S_{PkU}$ in the signature part 25. $S_{PkC}$ is a signature function concealed by a third party which assures security of the tamper-proof device 28. The third party may be an IC card manufacturer, a tamper-proof server administrator or the like. That is, tamper-proof capability of the tamper-proof device 28 which includes the signature function $S_{PkU}$ is assured by the third party which has the signature function $S_{PkC}$. A detailed description of the control part 23 will be given later. PkC is a verification key of $S_{PkC}$.

A storing part 22 of another user apparatus and/or a storing part 34 of an after-mentioned collector apparatus 3 can be used with the storing part 22 or instead of the storing part 22. In such a case, since data m and after-mentioned accredited information $(t_1, t_2, t_3)$ can be shared by the user apparatuses and the collector apparatuses, the data m and the accredited information $(t_1, t_2, t_3)$ are not necessarily sent between the apparatuses.

The authentication part 24 includes a verifier V. The signature part 25 includes the signature function $S_{PkU}$. Each of the user apparatuses have different $S_{PkU}$. $S_{PkU}$ is concealed by the signature part 25.

The number generation part 26 stores a next number $r_U$. When the number generation part 26 is required to issue a number, the number generation part 26 issues a current number $r_U$ and increments $r_U$.

The storing part 27 stores a set of manifests $C_U = \{c_1, c_2, \ldots, c_n\}$ and a set of numbers $R_U = \{r_1, r_2, \ldots, r_m\}$. These sets can be updated by the control part 21.

Figure 5:
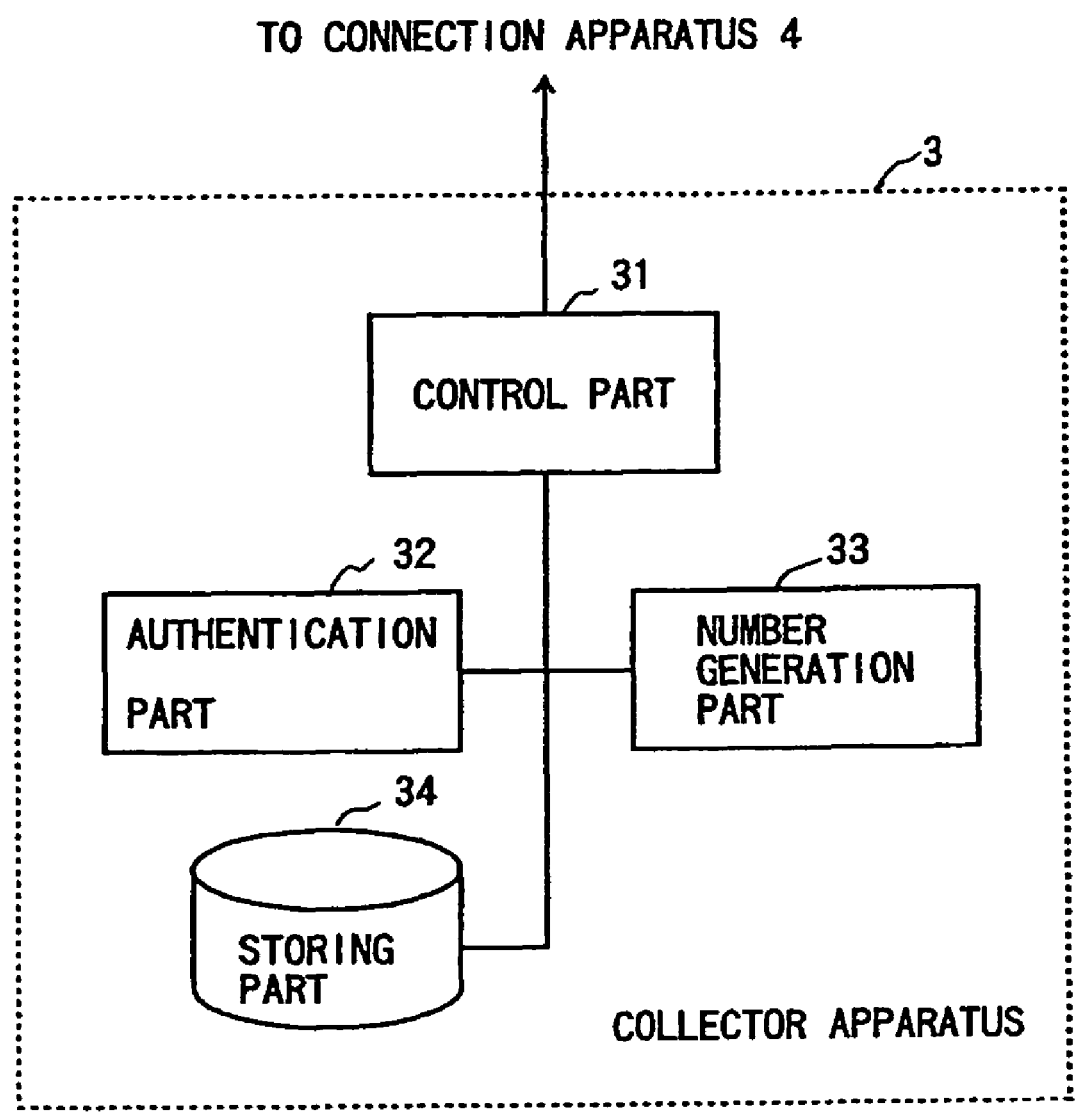
FIG. 5 is a block diagram of a collector apparatus of the data storing system according to the first embodiment of the present invention.

FIG. 5 is a block diagram of the collector apparatus 3 according to an embodiment of the present invention. The collector apparatus 3 includes a control part 31, an authentication part 32, a number generation part 33 and a storing part 34.

The control part 31 has a verification key PkV and controls the collector apparatus 3 for circulating the digital ticket securely. The detailed description of the operation of the control part 31 will be given later.

The authentication part 32 includes a verifier V.

The number generation part 33 stores a next number $r_V$. When the number generation part 33 is required to issue a number, the number generation part 33 issues a current number $r_V$ and increments $r_V$.

The storing part 34 stores a set of numbers $R_V = \{r_1, r_2, \ldots, r_m\}$. The set can be updated by the control part 31.

Figure 6:
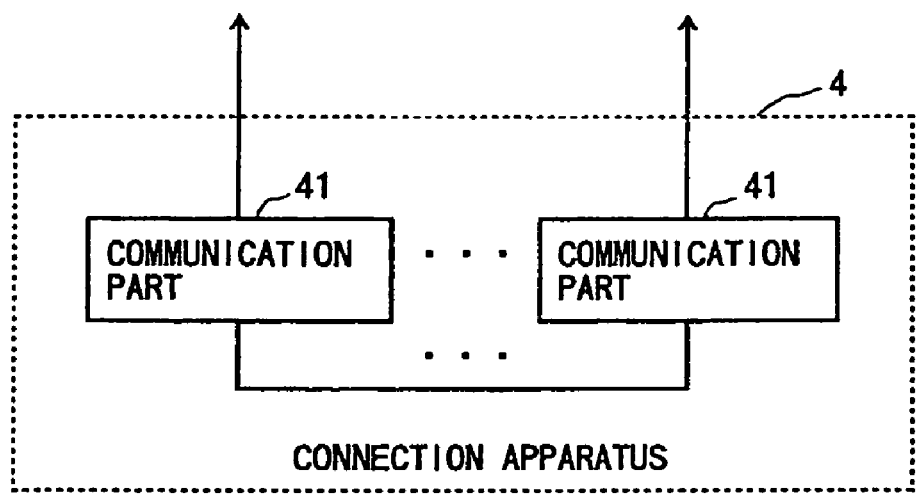
FIG. 6 is a block diagram of a connection apparatus of the data storing system according to the first embodiment of the present invention.

FIG. 6 is a block diagram of the connection apparatus 4 according to an embodiment of the present invention.

The connection apparatus 4 includes a communication part 41. The communication part 41 provides a temporal or permanent communication channel between the issuer apparatus 1, the user apparatus 2 and the collector apparatus 3, or between the user apparatuses. A terminal with an IC card slot at a kiosk, a plurality of PCs which are connected via network or the like can be used as the connection apparatus 4.

A method for circulating the digital ticket securely by using the above-mentioned apparatuses will be described in the following.

Basic concepts of the circulation method are shown below.

The digital ticket is represented by data with a signature by an issuer $m \cdot S_{PkI}(m)$. Contents of a right which is given to an owner of the digital ticket by the issuer are described in m. Otherwise, m includes a relation to data in which contents of the right are described.

Tampering with the digital ticket can be prevented by using the signature function $S_{PkI}$ of the issuer of the digital ticket.

Reproduction of the digital ticket is not prohibited.

A manifest $C_{(m, PkI)}$ can be generated from the digital ticket. The manifest is substantially in a one-to-one correspondence with the digital ticket.

The manifest becomes valid by being stored in the storing part 27 of the tamper-proof device 28 trusted by the issuer.

The tamper-proof device trusted by the issuer is a device in which the tamper-proof capability is insured by a party trusted by the issuer. The party trusted by the issuer is defined by an accredited information $t_I$.

A valid manifest can be newly generated only by the issuer of the corresponding digital ticket.

It is prohibited to generate one or a plurality of valid manifests from a valid manifest. That is, the user is prohibited from generating a manifest of a digital ticket which is signed by others.

In the following, the circulation method of a digital ticket will be described for each of the cases of (1) Issuing a digital ticket, (2) Transferring a digital ticket and (3) Consuming a digital ticket. In the following description, communication between the apparatuses is carried out via the communication part 41 of the connection apparatus 4.

(1) Issuing a Digital Ticket

Figure 7:
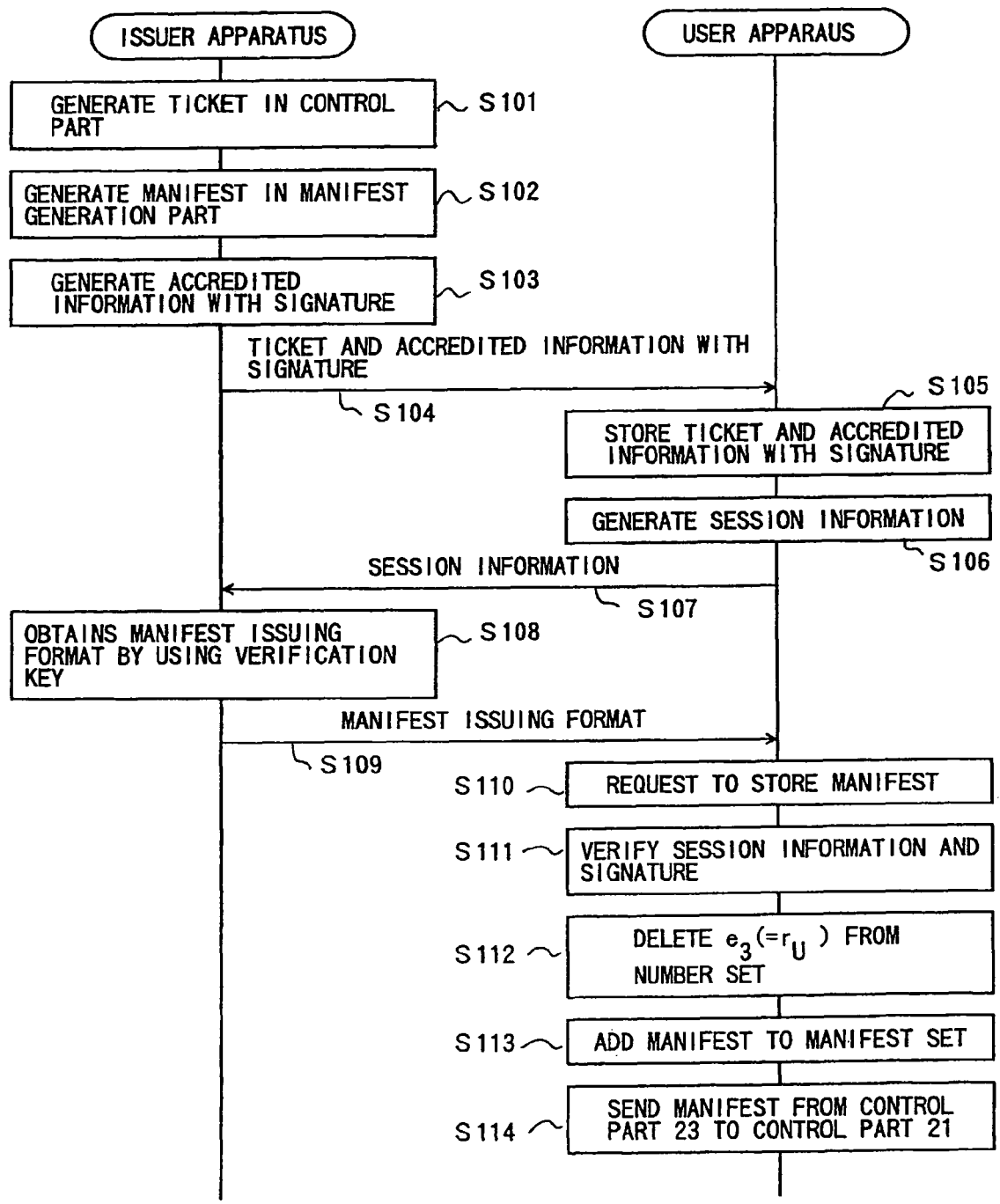
FIG. 7 is a sequence chart showing a ticket issuing process in the data storing system according to the first embodiment of the present invention.

The process for issuing a digital ticket from the issuer apparatus 1 to the user apparatus 2 via the connection apparatus 4 is shown below. FIG. 7 is a sequence chart of the process according to an embodiment of the present invention.

Step 101) The control part 11 obtains m and $S_{PkI}(m)$ according to the following procedure to generate a digital ticket $m \cdot S_{PkI}(m)$ which is data with a signature.

(a) The data generation part 13 generates data m.

(b) m is given to the signature part 12 such that the signature part 12 generates $S_{PkI}(m)$ Step 102) The control part 11 provides the digital ticket $m \cdot S_{PkI}(m)$ to the manifest generation part 14 such that the manifest generation part 14 generates a manifest $c_{(m, PkI)}$.

Step 103) The control part 11 obtains accredited information t and a signature function $S_{PkI}$ (t) according to the following procedure and generates accredited information with a signature $t \cdot S_{PkI}$ (t).
- (a) The accredited information generation part 15 generates the accredited information t. The configuration of t was described before.
- (b) The accredited information t is provided to the signature part 12 such that the signature part 12 generates the signature $S_{PkI}$ (t).

Step 104) The control part 11 sends the digital ticket $m \cdot S_{PKI}$ (m) and the accredited information with a signature $t \cdot S_{PkI}$ (t) to the control part 21.

In step 101, when m which is generated by the data generation part 13 is a relation to other data, for example, m=H ($m_0$), or when m includes the relation, the related data ($m_0$) is sent as necessary, which is the same as the cases of after-mentioned transferring and consuming.

Step 105) The control part 21 of the user apparatus 2 adds the digital ticket $m \cdot S_{PkI}$ (m) in the set $M_U$, adds the accredited information with the signature $t \cdot S_{PkI}$ (t) in the set $T_U$ and stores them in the storing part 22.

When data related to m is sent, the relation is verified. If the verification fails, the process is interrupted and the issuer apparatus is notified of it. This is the same as in the case of after-mentioned transferring and consuming.

Step 106) The control part 21 requests to generate session information ($s_1$, $s_2$) to the control part 23.

The control part 23 generates the session information ($s_1$, $s_2$) according to the following procedure and sends it to the control part 21.
- (a) The control part 23 obtains a number $r_U$ generated by the number generation part 26.
- (b) The number $r_U$ is added to a number set $R_U$ in the storing part 27.
- (c) The session information ($s_1$, $s_2$)=(H(PkU), $r_U$) is generated. Here, PkU is a verification key held by the control part 21.

Step 107) The control part 21 sends the session information ($s_1$, $s_2$) to the control part 11.

Step 108) The control part 11 obtains a manifest issuing format $e_I$=($e_1$, $e_2$, $e_3$, $e_4$, $e_5$) by using $S_{PkI}$ in the signature part 12 and the verification key PkI retained by the control part 11. Each element in $e_I$ is shown below.

$$e_1 = c_{(m, PkI)}$$

$$e_2 = s_1$$

$$e_3 = s_2$$

$$e_4 = S_{PkI}(c_{(m, PkI)}, s_1, s_2)$$

$$e_5 = PkI$$

Step 109) The control part 11 sends the manifest issuing format ex to the control part 21.

Step 110) The control part 21 sends the digital ticket $m \cdot S_{PkI}$ (m) and the manifest issuing format $e_I$ to the control part 23 and requests to store the manifest in $e_I$.

Step 111) The control part 23 verifies that following conditions are satisfied by using the authentication part 24. If the verification fails, the process after that is interrupted and the control part 23 notifies the control part 11 of the process interruption via the control part 21.

$$e_2 = H(PkU) \quad (1)$$

$$e_3 \cdot R_U \quad (2)$$

$$V_{e5}(m \cdot S_{PkI}(m)) = 1 \quad (3)$$

$$V_{e5}(e_1 \cdot e_2 \cdot e_3 \cdot e_4) = 1 \quad (4)$$

$$e_1 = H(m \cdot S_{PKI}(m)) \quad (5)$$

The above-mentioned formulas (1) and (2) mean verification of validity of the session information. According to the verification, fraud can be prevented. Such fraud may be, for example, storing a manifest issuing format destined to other user apparatus 2 or reproducing a manifest by reusing the manifest issuing format. The formulas (3) and (4) mean verification of validity of the signature of the manifest issuing format. According to the verification, the occurrence of a manifest other than one which is included in the manifest issuing format and which has a signature signed by the issuer is stored can be prevented. The formula (5) means verification of correspondence between the manifest and the digital ticket. According to the verification, the occurrence of a manifest which does not correspond to the digital ticket, such as one corresponding to other digital ticket, can be prevented.

Step 112) The control part 23 deletes $e_3$ (=$r_U$) from the number set $R_U$ in the storing part 27.

Step 113) The control part 23 adds $e_1$ (=$c_{(m, PkI)}$) to a manifest set $C_U$ in the storing part 27.

Step 114) The control part 23 sends $e_1$ to the control part 21 to notify of a normal end.

(2) Transferring a Digital Ticket

The digital ticket transferring process from the user apparatus 2a to the user apparatus 2b via the connection apparatus 4 will be described in the following.

Figure 8:
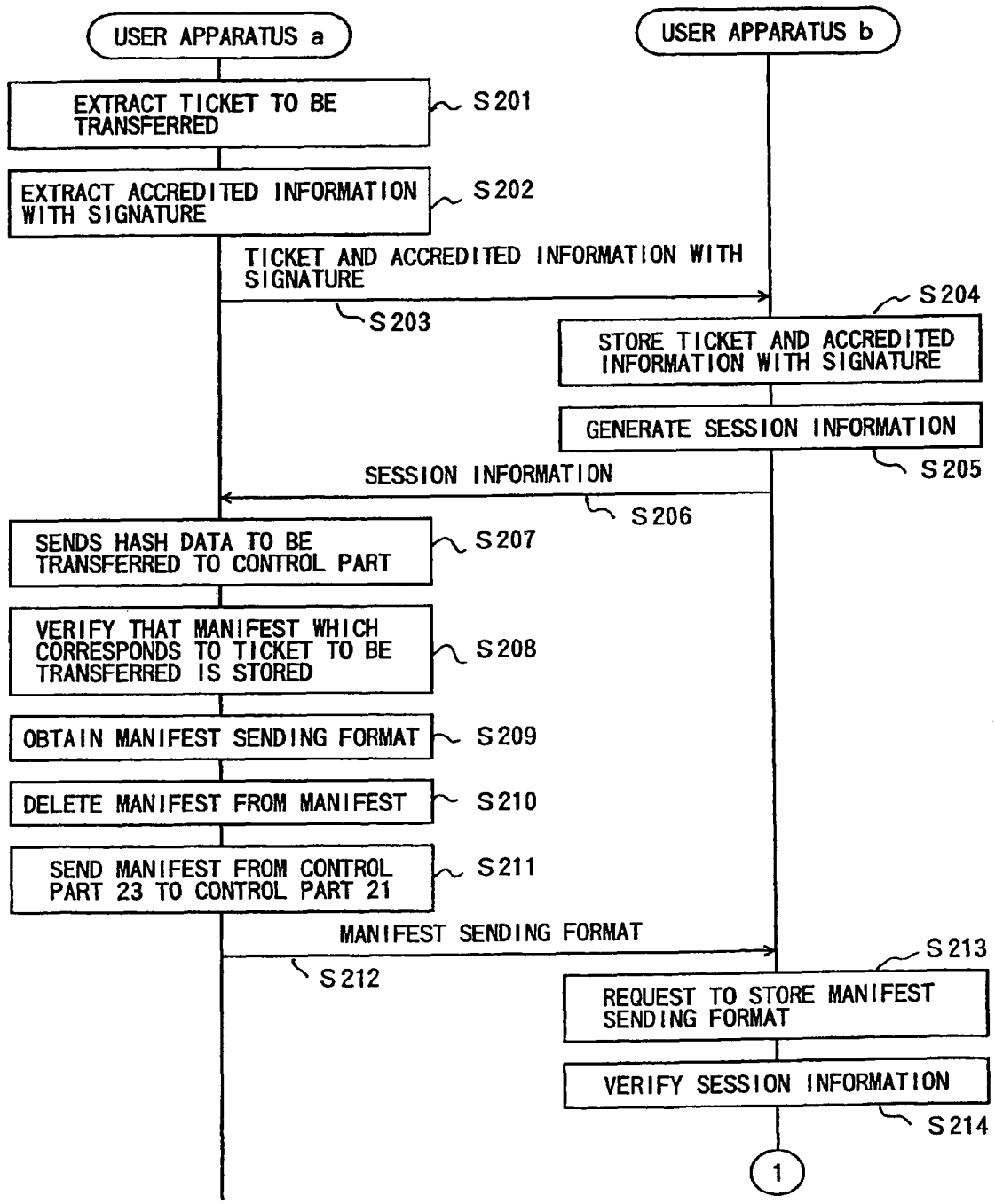
FIG. 8 is a sequence chart showing a ticket transferring process in the data storing system according to the first embodiment of the present invention.
Figure 9:
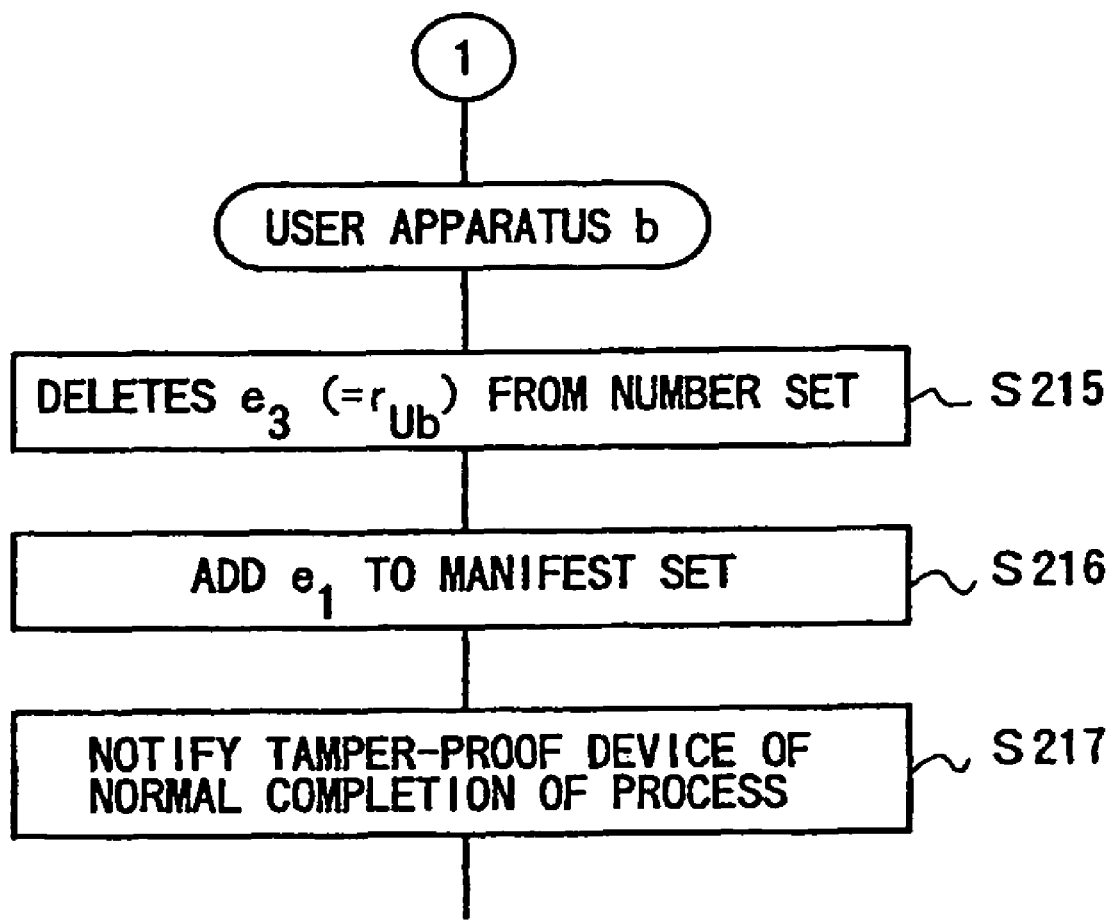
FIG. 9 is a sequence chart showing a ticket transferring process in the data storing system according to the first embodiment of the present invention.

FIG. 8 and FIG. 9 are sequence charts showing the digital ticket transferring process according to an embodiment of the present invention.

Step 201) The control part 21a extracts the digital ticket $m \cdot S_{PkI}$ (m) which is an object to be transferred from a set $M_{Ua}$ of data with a signature retained by the storing part 22a.

Step 202) The control part 21a extracts the accredited information $t \cdot S_{PkI}$ (t) with a signature by the issuer of $m \cdot S_{PkI}$ (m) from $T_{Ua}$ included in the storing part 22a.

Step 203) The control part 21a sends $m \cdot S_{PkI}$ (m) and $t \cdot S_{PkI}$ (t) to the control part 21b.

Step 204) The control part 21b stores $m \cdot S_{PkI}$ (m) in a set $M_{Ub}$ of data with the signature in the storing part 22b and stores $t \cdot S_{PkI}$ (t) in an accredited information set $T_{Ub}$ in the storing part 22b.

Step 205) The control part 21b requests the control part 23b to generate session information ($s_1$, $s_2$).

The control part 23b generates the session information ($s_1$, $s_2$) according to the following procedure and sends it to the control part 21b.
- (a) The control part 23 obtains a number $r_{Ub}$ generated by the number generation part 26b.
- (b) The number $r_{Ub}$ is added to a number set $R_{Ub}$ in the storing part 27b.
- (c) The session information ($s_1$, $s_2$)=(H(PkUb), $r_{Ub}$) is generated. Here, PkUb is a verification key held by the control part 21b.

Step 206) The control part 21b sends the session information ($s_1$, $s_2$) to the control part 21a.

Step 207) The control part 21a sends ($s_1$, $s_2$) and a hash value H($m \cdot S_{PkI}$ (m)) of the digital ticket to be transferred to the control part 23a.

Step 208) The control part 23a verifies that following formula is satisfied for a set of manifest $C_{Ua}$ of manifests which is stored in the storing part 27a.

$$H(m \cdot S_{PkI}(m)) \cdot C_{Ua} \quad (6)$$

When the verification fails, the process after that is interrupted and the control part 21a is notified of the failure.

The above formula (6) means verification that the manifest $c_{(m, PkI)} = H(m \cdot S_{PkI}(m))$ which corresponds to the digital ticket to be transferred is stored in the storing part 27a.

Step 209) The control part 23a obtains a manifest sending format $e_c = (e_1, e_2, e_3, e_4, e_5, e_6, e_7)$ by using $S_{PkUa}$ which is included in the signature part 25a and verification keys PkUa, PkCa, and a key certificate PkUa·$S_{PkCa}$(PkUa) which are included in the control part 11. Each element of $e_c$ is shown below.

$$e_1 = c_{(m, PkI)}$$

$$e_2 = s_1$$

$$e_3 = s_2$$

$$e_4 = S_{PkUa}(c_{(m, PkI)}, s_1, s_2)$$

$$e_5 = PkUa$$

$$e_6 = S_{PkCa}(PkUa)$$

$$e_7 = PkCa$$

Step 210) The control part 23a deletes $c_{(m, PkI)}$ from the set $C_{Ua}$ of manifest.

Step 211) The control part 23a sends $e_c$ to the control part 21a.

Step 212) The control part 21a sends $e_c$ to the control part 21b. The control part 21b verifies $e_1$ in the sent $e_c$ whether $e_1 = H(m \cdot S_{PkI}(m))$ is satisfied.

Step 213) The control part 21b sends $e_c$, $t \cdot S_{PkI}(t)$ and $m \cdot S_{PkI}(m)$ to the control part 23b and requests to store the manifest in $e_c$.

Step 214) The control part 23b verifies that all formulas below are satisfied by using the an authentication part 24b. If the verification fails, the process is interrupted and the control part 21b is notified of the interruption.

$$e_2 = H(PkUb) \quad (7)$$

$$e_3 \cdot R_{Ub} \quad (8)$$

$$V_{e5}(e_1 \cdot e_2 \cdot e_3 \cdot e_4, e_5) = \quad (9)$$

$$V_{e7}(e_4, e_6) = \quad (10)$$

$$H(e7) \cdot t_c \quad (11)$$

$$V_{tl}(m \cdot S_{PkI}(m)) = \quad (12)$$

$$V_{tl}(t \cdot S_{PkI}(t)) = \quad (13)$$

The above formulas (7) and (8) mean verification of validity of the session information. Using the verification, fraud such as storing a manifest sending format on another user apparatus, reproducing a manifest by reusing the manifest sending format or the like is prevented.

The formula (9) means verification for identifying the signer of the manifest sending format. The formula (10) means verification of the key certificate of the signer. The formula (11) means verification that the signer of the key certificate is trusted by the issuer as an accredited object in the accredited information. According to the above verification, it is verified that the tamper-proof capability of the source of the manifest sending format is assured by a party trusted by the issuer.

The formulas (12) and (13) mean verification of validity of the signature signed on the accredited information. According to the verification, it is verified that the accredited information is properly signed by the signer of the digital ticket.

Step 215) The control part 23b deletes $e_3$ ($= r_{Ub}$) from the number set $R_{Ub}$ in the storing part 27b.

Step 216) The control part 23b adds $e_1$ ($= c_{(m, PkI)}$) to the manifest set $C_{Ub}$ in the storing part 27b.

Step 217) The control part 23b notifies the control part 21b of the normal completion of the process.

(3) Consuming the Digital Ticket

The digital ticket consuming process from the user apparatus 2 to the collector apparatus 3 via the connection apparatus 4 will be described in the following.

Figure 10:
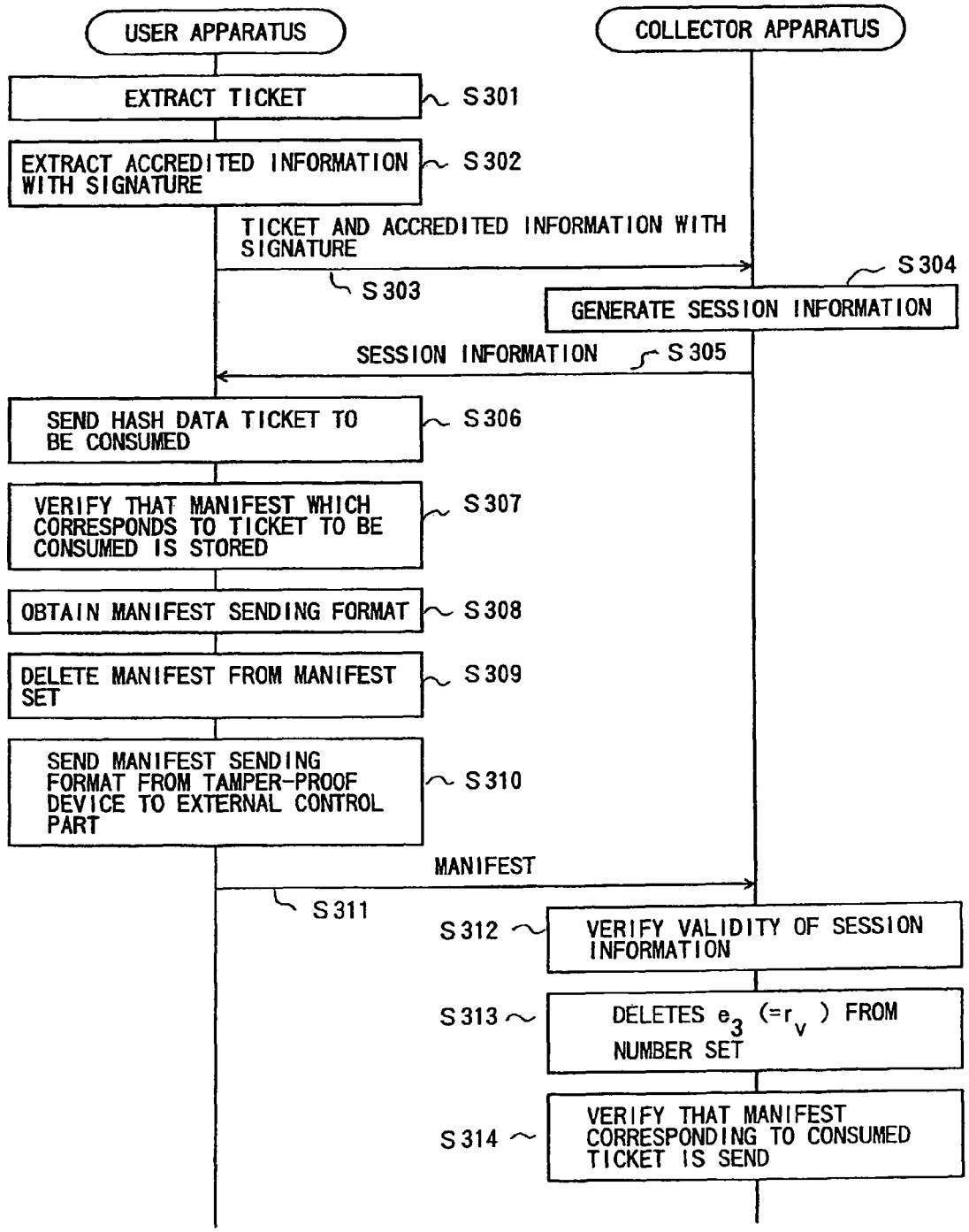
FIG. 10 is a sequence chart showing a ticket consuming process in the data storing system according to the first embodiment of the present invention.

FIG. 10 is a sequence chart of the ticket consuming process according to an embodiment of the present invention.

Step 301) The control part 21 extracts a digital ticket $m \cdot S_{PkI}(m)$ to be consumed from the signed data set $M_U$ which is included in the storing part 22.

Step 302) The control part 21 extracts the accredited information $t \cdot S_{PkI}(t)$ signed by the issuer of $m \cdot S_{PkI}(m)$ from the signed accredited information set $T_U$ included in the storing part 22.

Step 303) The control part 21 sends $m \cdot S_{PkI}(m)$ and $t \cdot S_{PkI}(t)$ to the control part 31.

Step 304) The control part 31 generates session information $(s_1, s_2)$ according to the following procedure.

(a) The control part 23 obtains a number $r_V$ from the number generation part 33.

(b) The number $r_V$ is added to a number set $R_V$ in the storing part 34.

(c) The session information $(s_1, s_2) = (H(PkV), r_V)$ is generated. Here, PkV is a verification key held by the control part 31.

Step 305) The control part 31 sends the session information $(s_1, s_2)$ to the control part 21.

Step 306) The control part 21 sends $(s_1, s_2)$ and a hash value $H(m \cdot S_{PkI}(m))$ of the digital ticket to be consumed to the control part 23.

Step 307) The control part 23 verifies that a following formula is satisfied for a set of manifests $C_U$ which is stored in the storing part 27.

$$H(m \cdot S_{PkI}(m)) \cdot C_U \quad (15)$$

When the verification fails, the process after that is interrupted and the control part 21 is notified of the failure.

The above formula (15) means verification that the manifest $c_{(m, PkI)} = H(m \cdot S_{PkI}(m))$ which corresponds to the digital ticket to be consumed is stored in the storing part 27.

Step 308) The control part 23 obtains a manifest sending format $e_c = (e_1, e_2, e_3, e_4, e_5, e_6, e_7)$ by using the signature function $S_{PkU}$ which is included in the signature part 25 and verification keys PkU, PkC, and a key certificate PkU·$S_{PkC}$(PkU) which are included in the control part 21. Each element of $e_c$ is shown below.

$$e_1 = c_{(m, PkI)}$$

$$e_2 = s_1$$

$$e_3 = s_2$$

$$e_4 = S_{PkU}(c_{(m, PkI)}, s_1, s_2)$$

$$e_5 = PkU$$

$$e_6 = S_{PkC}(PkU)$$

$$e_7 = PkC$$

Step 309) The control part 23 deletes $c_{(m,\ Pkl)}$ from the manifest set $C_U$.

Step 310) The control part 23 sends $e_c$ to the control part 21.

Step 311) The control part 21 sends $e_c$ to the control part 31.

Step 312) The control part 31 verifies that all formulas below are satisfied by using the authentication part 32. If the verification fails, the process is interrupted and the control part 21 is notified of the interruption.

$$e_2 = H(PkV) \tag{16}$$

$$e_3 \cdot R_V \tag{17}$$

$$V_{e5}(e_1 e_2 e_3 e_4, e_5) = \tag{18}$$

$$V_{e7}(e_5 \cdot e_6) = \tag{19}$$

$$H(e_7) \cdot t_c. \tag{20}$$

$$V_{tl}(m \cdot S_{Pkl}(m)) = \tag{21}$$

$$V_{tl}(t \cdot S_{Pkl}(t)) = \tag{22}$$

The above formulas (16) and (17) mean verification of validity of the session information. Using the verification, fraud such as storing a manifest sending format on another collector apparatus, reproducing a manifest by reusing the manifest sending format or the like is prevented.

The formula (18) means verification for identifying the signer of the manifest sending format. The formula (19) means verification of the key certificate of the signer. The formula (20) means verification that the signer of the key certificate is trusted by the issuer as an accredited object in the accredited information. According to the above verification, it is verified that the tamper-proof capability of the source of the manifest sending format is assured by a party trusted by the issuer.

The formulas (21) and (22) mean verification of the validity of the signature for the accredited information. According to the verification, it is verified that the accredited information is properly signed by the signer of the digital ticket.

Step 313) The control part 31 deletes $e_3$ (=$r_V$) from $R_V$ in the storing part 34.

Step 314) The control part 31 verifies that all formulas below are satisfied. If the verification fails, the control part 21 is notified of process interruption. If the verification succeeds, a service corresponding to m is provided to the consumer.

$$e_1 = H(m \cdot S_{PKI}(m)) \tag{23}$$

The above formula (23) means verification that a manifest corresponding to the consumed digital ticket has been sent. According to the verification, it is verified that a valid digital ticket has been consumed.

Each element of the issuer apparatus 1, the user apparatus 2 or the collector apparatus 3 can be constructed by a program. The program can be stored in a disk unit connected to a computer which may be used as the issuer apparatus, the user apparatus or the collector apparatus. The program can be also stored in a transportable computer readable medium such as a floppy disk, a CD-ROM or the like. The program may be installed from the computer readable medium to a computer such that the present invention is realized by the computer.

As mentioned above, according to the first embodiment of the present invention, since only manifests of the number which the signer intends to store are stored in the manifest storing part in the data storing system, the occurrence of a manifest newly stored by a person other than the signer can be prevented. In addition, it can be prevented that valid data exceeding the number of the manifests may exist. Further, it becomes possible that the manifests can be transmitted only via routes which are trusted by the signer.

By using the digital ticket as data in the data storing system of the present invention, the number of valid reproductions of the digital ticket can be maintained at less than a constant number without storing the digital tickets in the tamper-proof device.

In addition, by using a program as data of the present invention and by using the manifest as a license of the program, illegal copying and use of the program can be prevented.

Further, by using music data or image data as data of the present invention, illegal copying and use of the music data or image data can be prevented. Furthermore, by "consuming" ((3) in the embodiment) the data each time when the data is used, the system of the present invention can be used for billing per use in a billing system (for example, a pay per view billing system).

Second Embodiment

In the following, a second embodiment of the present invention will be described.

According to the above mentioned first embodiment, only data which represents originality (manifest) is stored in the tamper-proof apparatus and it is ensured that the number of valid reproductions of data is maintained below a pre-set constant number. Therefore, the tamper-proof device does not necessarily perform verifications other than the verification on reproducing. The verifications include a verification of validity of description. Thus, processing load such as processing speed and memory capacity can be decreased. The above-mentioned invention has remarkable effects in comparison with the conventional technology. However, there are two main problems described below as to the matter of practicality.

First, when generating the data representing originality or authenticity or genuineness, it is necessary to send data and the signature to the tamper-proof device in order to verify the data and the signature. On the other hand, the transmitting speed of an IC card is about 9600 bps (ISO-7816), which is relatively low. Therefore, when the size of the data is large, the time for generating the data representing originality may be remarkably increased.

In addition, according to the above-mentioned first embodiment, the data representing originality is generated from data and the signature, and it is necessary to verify the data representing originality by using the data and the signature when consuming the data. Therefore, it becomes necessary to circulate not only the data but also the signature. Therefore, the memory capacity necessary for the system and the processing time for circulation may be increased.

In the second embodiment, an original data circulation system will be described. According to the system, the processing load for generating data representing originality (which will be called a token) and circulating the data is decreased.

FIG. 11 is a block diagram for explaining the principle of the second embodiment of the present invention.

The original data circulation for storing and circulating original data which is digital information includes an issuer apparatus 50, a user apparatus 60 and a collector apparatus 70.

The issuer apparatus includes a first originality information generation part 51, and a first originality information sending part 52. The first originality information generation part 51 generates originality information. The first originality information sending part 52 sends the originality information.

Here, the originality information is information which represents genuineness of the right of issued data. In other words, the originality information represents the authenticity or originality of issued data.

The user apparatus 60 includes a second originality information sending part 61, a first identifying part 62, a first authentication part 63 and a storing part 64.

The second originality information sending part 61 receives originality information which is formed by fifth information corresponding to an apparatus and by sixth information which is data or which corresponds to the data. The first identifying part 62 identifies a source apparatus of the originality information when the originality information is received from another apparatus. When the source apparatus is authenticated, the first authentication part 63 determines that the originality information is valid only when the source apparatus and information corresponding to first information of the originality information are the same. The storing part 64 stores the originality information when the originality information is determined as valid by the first authentication part 63.

The collector apparatus 70 includes a second identifying part 71, a second authentication part 72 and a data processing part 73.

The second identifying part 71 identifies a source apparatus which sends originality information. The second authentication part 72 authenticates the source apparatus. The data processing part 73 carries out processing for the originality information data or data corresponding to the second information.

FIGS. 12A and 12B show the configurations of the data storing system in the original data circulation system.

In the figure, the issuer of the digital ticket has an issuer apparatus 100 and the user who receives the digital ticket has a user apparatus 200. When issuing a digital ticket, a communication channel between the issuer apparatus 100 and the user apparatus 200 is established via a connection apparatus 400. The issuer apparatus 100 sends the digital ticket which is validated in the issuer apparatus 100 to the user apparatus 200.

The above-mentioned apparatuses can be configured as shown in FIGS. 12A and 12B. FIG. 12A shows a representative configuration when an IC card is used for the user apparatus 200 and an IC card reader is used for the connection apparatus 400. FIG. 12B shows a representative configuration when a tamper-proof device such as an IC card or a PC which is kept in a safe place is used as the user apparatus and a network is used for the connection apparatus 400. The configurations shown in FIGS. 12A and 12B can be mixed.

The above-mentioned communication channel may exist only during the period from the issuing start time to the issuing end time, which applies to the cases of "transferring", "consuming" and "presenting".

When transferring the digital ticket, a communication channel is established between the user apparatuses 200 via the communication apparatus 400 in the same way as when issuing the digital ticket. Then, the digital ticket is transferred between the user apparatuses 200.

A collector of the digital tickets has a collector apparatus 300. When consuming the digital tickets, a communication channel is established between the user apparatus 200 and the collector apparatus 300 via the communication apparatus 400 in the same way as when issuing the digital ticket. Then, a valid digital ticket is transferred to the collector apparatus 300.

When presenting the digital tickets, a communication channel is established between the user apparatuses 200 or between the user apparatus 200 and the collector apparatus 300 via the communication apparatus 400 such that the user apparatus 200 presents a certificate that the user apparatus 200 has a valid digital ticket to another user apparatus or to the collector apparatus 300.

As mentioned above, the data storing system of the present invention includes one or a plurality of issuer apparatuses 100, one or a plurality of user apparatuses 200 and one or a plurality of collector apparatuses 300 which apparatuses are connected by connection apparatuses 400 which provide temporal communication channels.

In the following, the embodiment of the present invention will be described with reference to figures.

Each apparatus which forms the above-mentioned data storing system will be described by using FIGS. 13-16. The meaning of formulas used for descriptions below are almost the same as those used in the first embodiment. Especially, a combination $(Pk2, S_{Pk1}(Pk2))$ of a digital signature $S_{Pk1}(Pk2)$ of Pk2 by a verification key Pk2 and $S_{Pk1}$ is called as a key certificate of Pk2 by Pk1. $H(Pk)$ is called as a hash value of Pk.

Figure 13:
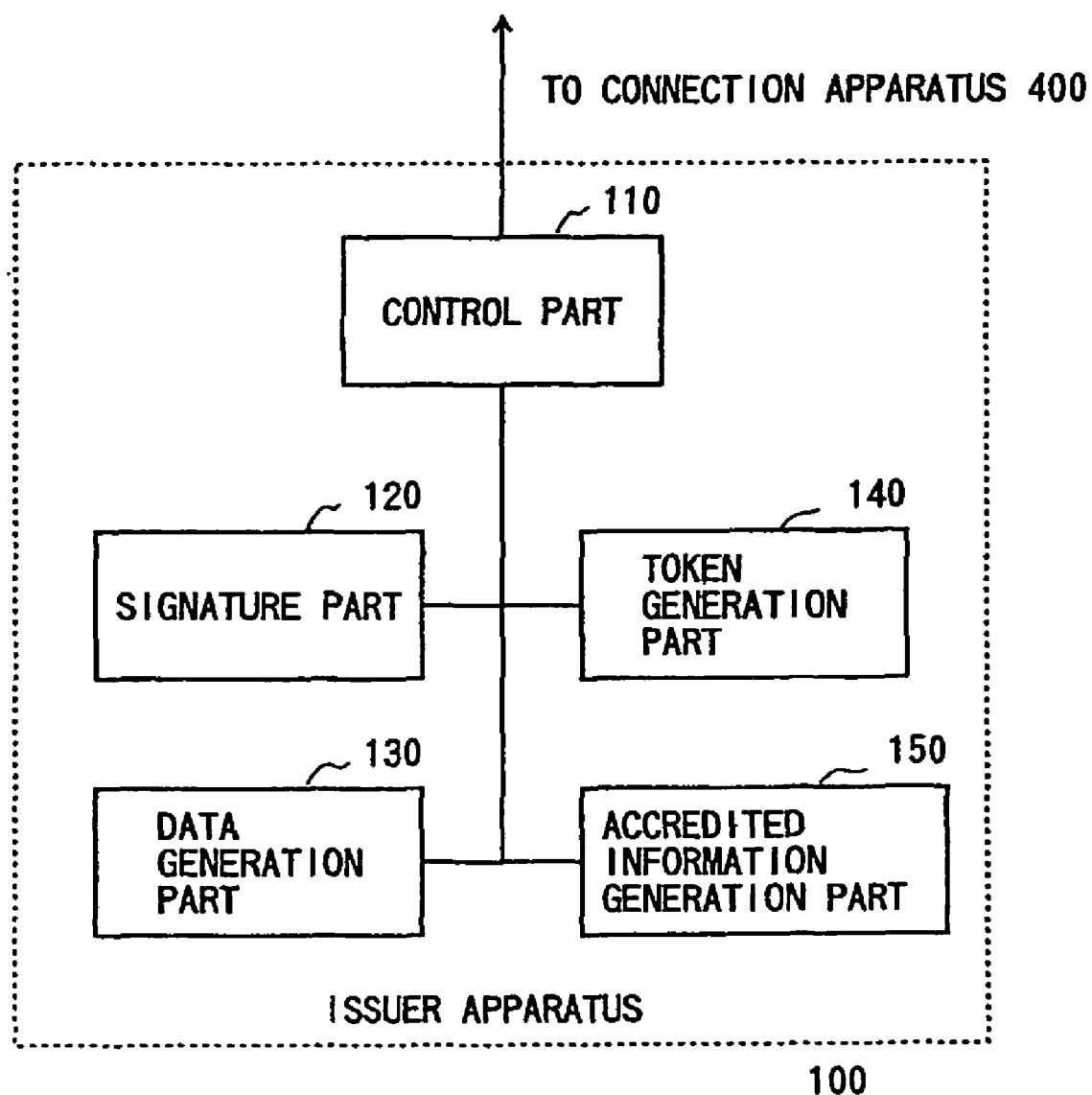
FIG. 13 is a block diagram of an issuer apparatus of the original data circulation system according to the second embodiment of the present invention.

FIG. 13 shows an issuer apparatus according to an embodiment of the present invention.

The issuer apparatus 100 shown in the figure includes a control part 110, a signature part 120, a data generation part 130, a token generation part 140 and an accredited information generation part 150.

The control part 110 has a verification key PkI and enables the issuer apparatus 100 to circulate a digital ticket securely. PkI is a verification key corresponding to a signature function $S_{PkI}$ provided in the signature part 120. The hash value of it $H(PkI)$ is used as an identifier for identifying the issuer. A detailed description of the control part 110 will be given later.

The signature part 120 includes a signature function $S_{PKI}$. $S_{PkI}$ is different for each issuer apparatus 100 and concealed by the signature part 120.

The data generation part 130 generates data m on the basis of information generated in the issuer apparatus 100 or information given from outside. According to the data storing system of the present invention, there is no restriction on the contents of the data m. Therefore, digital information representing rights of general tickets such as a concert ticket, program data, music data and image data can be used as the data m.

The token generation part 140 has the unidirectional hash function H and generates a token $(c_1, c_2)=(H(m), H(PkI))$ from data m and a verification key PkI. $c_2$ is token issuer information which is a hash value that identifies the issuer of the token. Hash of data m is used as $c_1$ here; however, an identifier for identifying m can also be used as $c_1$.

The accredited information generation part 150 generates accredited information $(t_1, t_2, t_3)$. $(t_1, t_2, t_3)$ that can be formed as shown below by using the signature part 120.

$$t_1 = \{H(PkA_1), H(PkA_2), \ldots, H(PkA_n)\}$$

$$t_2 = S_{PkI}(H(PkA_1) \cdot H(PkA_2) \ldots H(PkA_n))$$

$$t_3 = PkI$$

Here, $H(PkA_i)$ is a hash value for identifying an aftermentioned third party who is "trusted" by the issuer.

The accredited information can also be formed $(t'_1, t'_2, t'_3, t'_4)$ as shown below.

$$t'_1 = \{H(PkA_1), H(PkA_2), \ldots, H(PkA_n)\}$$

$$t'_2 = H(m)$$

$$t'_3 \cdot S_{PkI}(H(PkA_1) \cdot H(PkA_2) \ldots H(PkA_n) \cdot H(m))$$

$$t'_4 = PkI$$

In this case, $H(PkA_i)$ is a hash value for identifying a third party trusted by the issuer for circulating data m.

In addition, a third party may issue accredited information such that the above-mentioned accredited information can be constructed recursively.

Further, the accredited information may be stored beforehand in a control part of the tamper-proof device of the user apparatus or a control part of the collector apparatus instead of being generated by each issuer. In this case, the signature is not necessary and the accredited information can be constituted as $(t''_1, t''_2)$ or only $t''_1$ as shown below.

$$t''_1 = \{H(PkA_1), H(PkA_2), \ldots, H(PkA_n)\}$$

$$t''_2 = H(m)$$

In such a case, $H(PkA_1)$ is a hash value for identifying a third party trusted by a third party which made the control part for circulating the data m.

In the following, the accredited information is assumed as $(t_1, t_2, t_3)$. However, any of the above-mentioned accredited information can be used.

Figure 14:
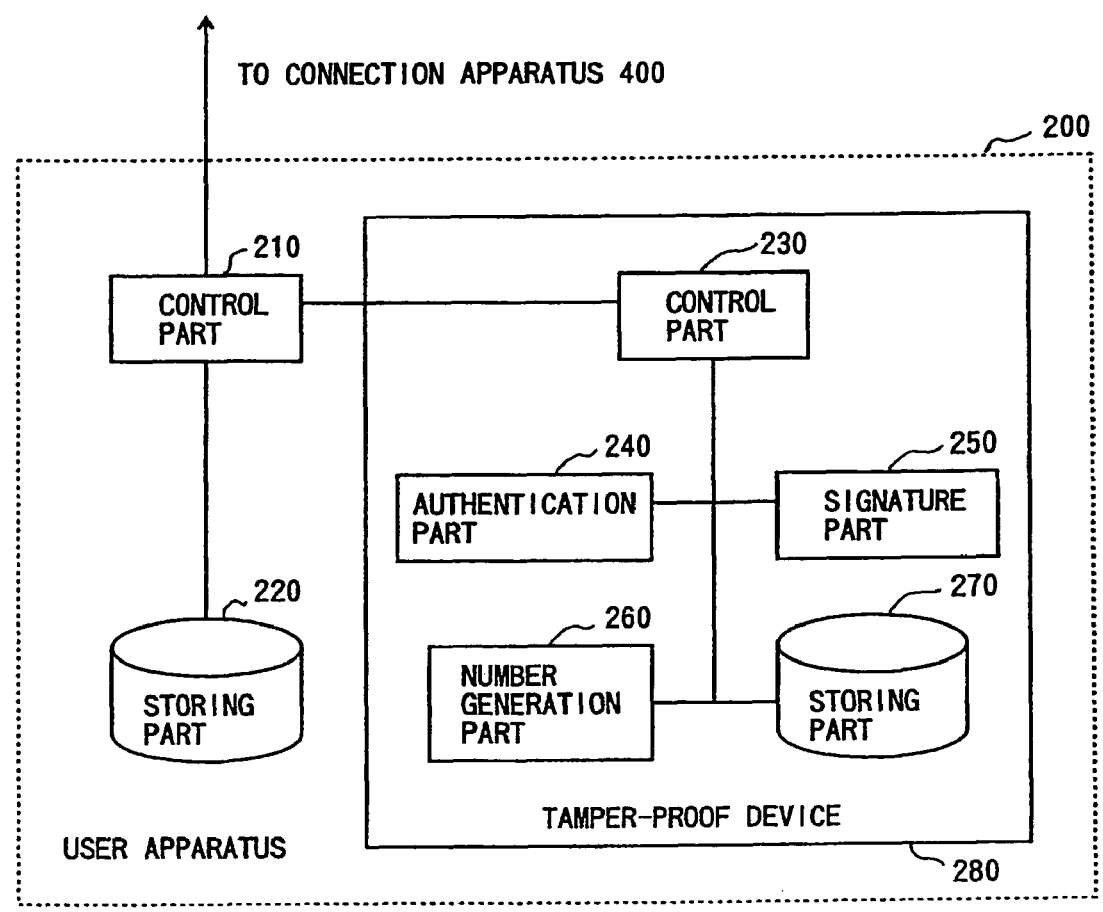
FIG. 14 is a block diagram of a user apparatus of the original data circulation system according to the second embodiment of the present invention.

FIG. 14 is a user apparatus 200 according to an embodiment of the present invention.

The user apparatus 200 includes a control part 210, a storing part 220 and the tamper-proof device 280 which has a control part 230, an authentication part 240, a signature part 250, a number generation part 260 and a storing part 270. The tamper-proof device 280 protects functions and contents of each part from tampering. Even the user of the tamper-proof device 280 can not tamper with the tamper-proof device 280. An IC card or a server which is stringently managed by a third party via a network can be used as the tamper-proof device 280.

The control part 210 includes issuer information $I_u = \{H(PkI_1), H(PkI_2), \ldots, H(PkI_n)\}$. The control part 210 and the control part 230 in the tamper-proof device 280 control the user apparatus 200 for circulating a digital ticket securely. $I_u$ is a set representing an issuer trusted by a user and can be updated by the user at any time. The control part 210 determines that only the token issued by an issuer included in $I_u$ is valid. The detailed description of the control part 210 will be described later.

In addition, $I_U$ can be realized as $I_U(m_i) = \{H(PkI_{i1}), H(PkI_{i2}), \ldots, H(PkI_{in})\}$. That is, sets of issuer information are managed from one data to another data.

The storing part 220 stores a set $M_u$ of data which is held by a user and a set $T_u$ of accredited information. The sets can be updated by the control part 210.

The control part 230 has verification keys PkU, PkA, and a key certificate (PkU, $S_{PkA}$(PkU)). The control part 230 controls the user apparatus for circulating the digital ticket securely. Here, the verification key PkU corresponds to $S_{PkU}$ in the signature part 250. Hash data of it H(PkU) is used, as an identifier for identifying the user apparatus. $S_{PkA}$ is a signature function concealed by a third party which assures safety of the tamper-proof device 280. The third party may be an IC card manufacturer, a tamper-proof server administrator or the like. That is, tamper-proof capability of the tamper-proof device 280 which includes the signature function $S_{PkU}$ is assured by the third party who has the signature function $S_{PkA}$. A detailed description of the control part 230 will be given later. PkA is a verification key of $S_{PkA}$.

The authentication part 240 includes a verifier V.

The signature part 250 includes the signature function $S_{PkU}$. Each of the user apparatuses have different $S_{PkU}$. $S_{PkU}$ is concealed by the signature part 250.

The number generation part 260 stores a next number $r_U$. When the number generation part 260 is required to issue a number, the number generation part 260 issues a current number $r_U$ and increments $r_U$. Here, $r_U$ is a positive number.

The storing part 270 stores a set of tokens $C_U$ and a set of numbers $R_U$. These sets can be updated by the control part 230.

Figure 15:
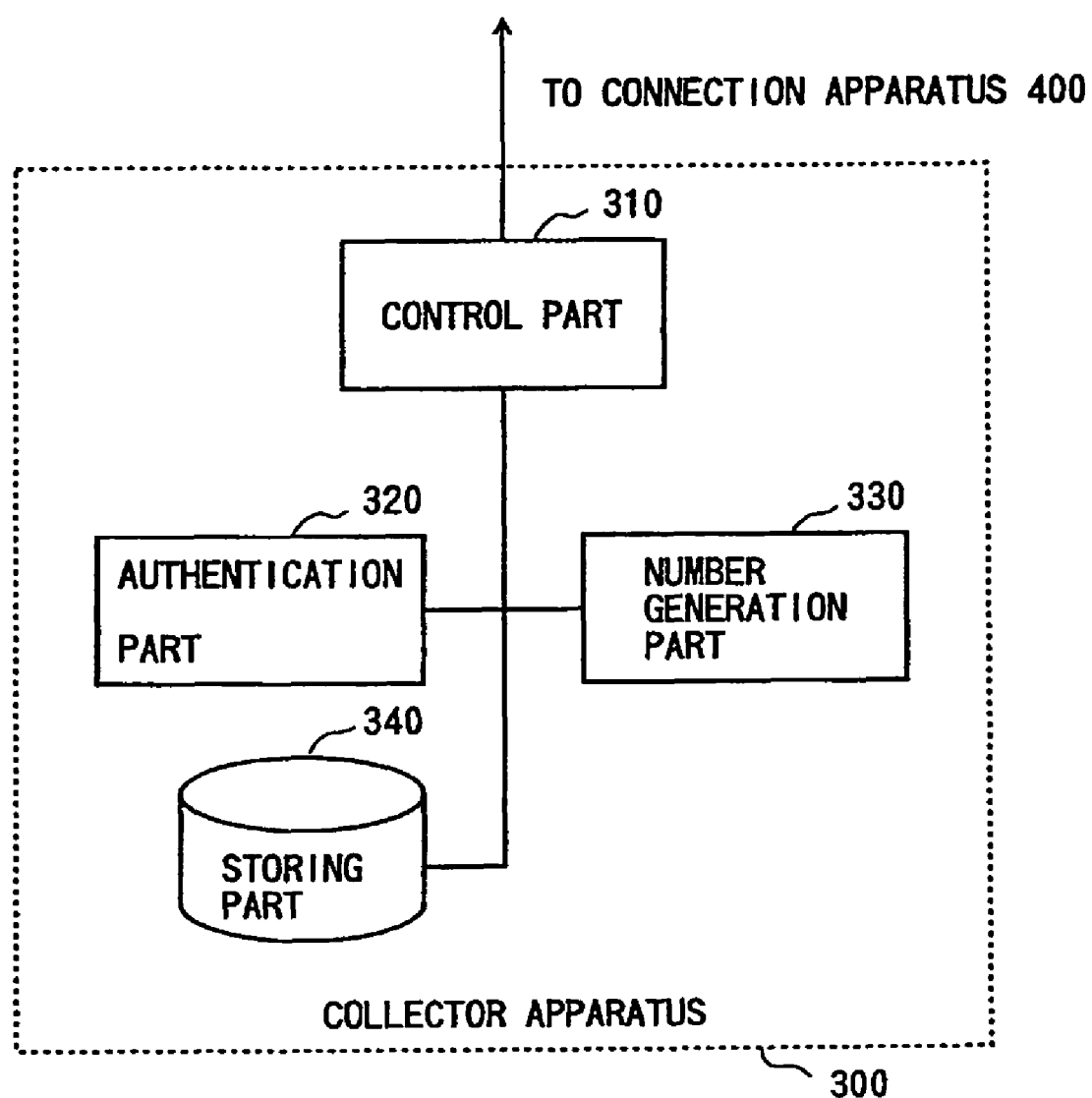
FIG. 15 is a block diagram of a collector apparatus of the original data circulation system according to the second embodiment of the present invention.

FIG. 15 is a block diagram of the collector apparatus according to an embodiment of the present invention. The collector apparatus 300 includes a control part 310, an authentication part 320, a number generation part 330 and a storing part 340.

The control part 310 has a verification key PkE and issuer information $I_E = \{H(PkI_1), H(PkI_2), \ldots, H(PkI_n)\}$, and controls the collector apparatus 300 for circulating the digital ticket securely. $I_E$ is a set representing an issuer trusted by the collector and can be updated by the issuer at any time. The control part 310 determines that only the token issued by an issuer included in $I_E$ is valid and provides a service for consumption of only the digital ticket with the valid token. The detailed description of the operation of the control part 310 will be given later.

In addition, in the same way as $I_U$ in the control part 210, $I_E$ can be realized as $I_E(m_i) = \{H(PkI_{i1}), H(PkI_{i2}), \ldots, H(PkI_{in})\}$. That is, sets of issuer information are managed from one data to another data.

The authentication part 320 includes a verifier V.

The number generation part 330 stores a next number $r_E$. When the number generation part 330 is required to issue a number, the number generation part 330 issues a current number $r_E$ and increments $r_E$. $r_E$ is a positive number.

The storing part 340 stores a set of numbers $R_E$. The set can be updated by the control part 310.

Figure 16:
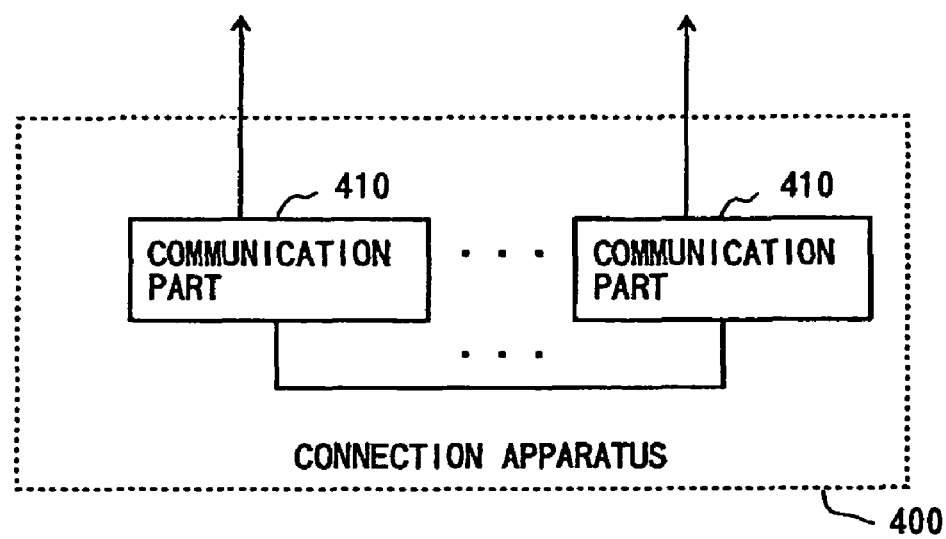
FIG. 16 is a block diagram of a connection apparatus of the original data circulation system according to the second embodiment of the present invention.

FIG. 16 is a block diagram of the connection apparatus 400 according to an embodiment of the present invention.

The connection apparatus 400 includes a communication part 410. The communication part 410 provides a temporal or permanent communication channel between the issuer apparatus 100, the user apparatus 200 and the collector apparatus 300, or between the user apparatuses. A terminal with an IC card slot at a kiosk, a plurality of PCs which are connected via network or the like can be used as the connection apparatus 400.

A method for circulating the digital ticket securely by using the above-mentioned apparatuses will be described in the following.

In the following, the circulation method of a digital ticket will be described for each of the cases of (1) Issuing a digital ticket, (2) Transferring a digital ticket and (3) Consuming a digital ticket. In the following description, communication between the apparatuses is carried out via the communication part 410 in the connection apparatus 400.

(1) Issuing a Digital Ticket

Figure 17:
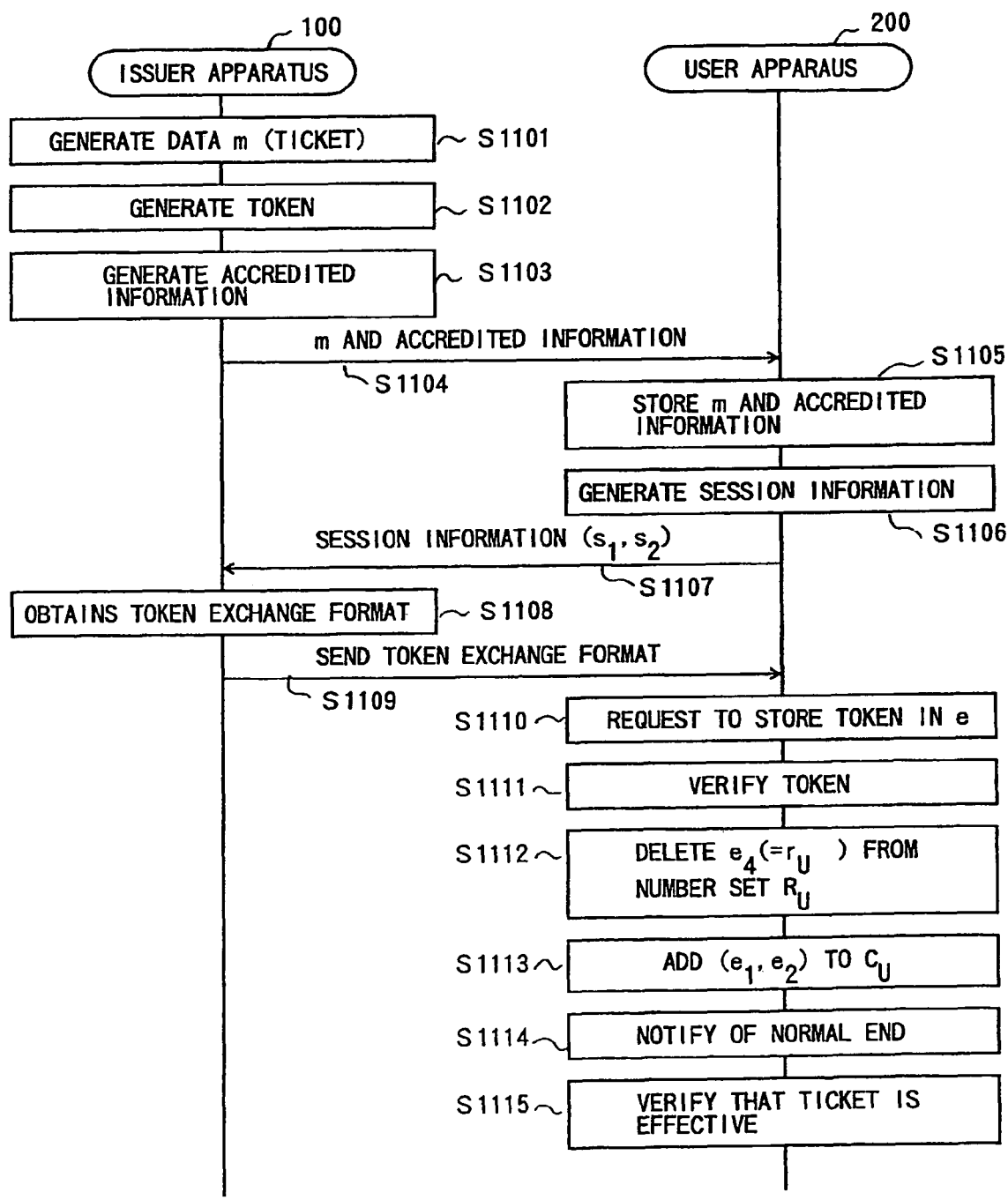
FIG. 17 is a sequence chart showing a ticket issuing process in the original data circulation system according to the second embodiment of the present invention.

FIG. 17 is a sequence chart of the process according to an embodiment of the present invention. In the figure, the connection apparatus 400 existing between the issuer apparatus 100 and the user apparatus 200 is not shown.

Step 1101) The control part 110 of the issuer apparatus 100 obtains data m from the data generation part 130. The data m is the digital ticket describing right information.

Step 1102) The control part 110 of the issuer apparatus 100 provides the data m and PkI to the token generation part 140 such that the token generation part 140 generates a token $(c_1, c_2) = (H(m), H(PkI))$.

Step 1103) The control part 110 obtains accredited information $(t_1, t_2, t_3)$ from the accredited information generation part 150. The configuration of the accredited information is shown before.

Step 1104) The control part 110 sends m and $(t_1, t_2, t_3)$ to the control part 210 in the user apparatus 200.

Step 1105) The control part 210 of the user apparatus 200 adds m in $M_U$ of the storing part 220, adds $(t_1, t_2, t_3)$ in $T_U$ of the storing part 220 and stores them in the storing part 220.

Step 1106) The control part 210 requests control part 230 to generate session information $(s_1, s_2)$.

The control part 230 generates the session information $(s_1, s_2)$ according to the following procedure and sends it to the control part 210.

(a) The control part 230 obtains a number $r_U$ generated by the number generation part 260 in the tamper-proof device 280.

(b) The number $r_U$ is added to a number set $R_U$ in the storing part 270.

(c) The session information $(s_1, s_2)=(H(PkU), r_U)$ is generated. Here, PkU is a verification key held by the control part 210.

Step 1107) The control part 210 sends the session information $(s_1, s_2)$ to the control part 110 of the issuer apparatus 100.

Step 1108) The control part 110 of the issuer apparatus 100 obtains a token exchange format $e=(e_1, e_2, e_3, e_4, e_5, e_6, e_7, e_8)$ by using $S_{PkI}$ in the signature part 120 and the verification key PkI retained by the control part 110. Each element in e is shown below. When issuing the digital ticket, since $e_7$ and $e_8$ are dummy data, each of $e_7$ and $e_8$ can take any value.

$e_1 = c_1$ $e_2 = c_2$ $e_3 = s_1$ $e_4 = s_2$ $e_5 = S_{PkI}(c_1 \cdot c_2 \cdot c_3 \cdot c_4)$ $e_6 = PkI$ $e_7 = any$ $e_8 = any$ Step 1109) The control part 110 sends e to the control part 210 of the user apparatus 200.

Step 1110) The control part 210 sends e to the control part 230 and requests control part 230 to store the token in e.

Step 1111) The control part 230 in the tamper-proof device 280 verifies that following formulas are satisfied by using the authentication part 240. If the verification fails, the process after that is interrupted and the control part 230 notifies the control part 110 in the issuer device 100 of the process interruption via the control part 210.

$$e_3 = H(PkU) \quad (1)$$

$$e_4 \cdot R_U \quad (2)$$

$$V_{e6}(e_1 \cdot e_2 \cdot e_3 \cdot e_4, e_5) = 1 \quad (3)$$

$$e_2 = H(e_6) \quad (4)$$

The above-mentioned formulas (1) and (2) mean verification of validity of the session information. Using the verification, fraud can be prevented. Such fraud may be, for example, storing a token exchange format in an other user apparatus 200 or reproducing a token by reusing the token exchange format.

The formula (3) means verification of validity of the signature of the token exchange format. According to the verification, tampering with the token exchange format can be prevented.

The formula (4) means verification of the validity of the token issuer information. According to the verification, storing token issued by an issuer other than the signer of the token can be prevented.

Step 1112) The control part 230 in the tamper-proof device 280 of the user apparatus 200 deletes $e_4(=r_U)$ from the number set $R_U$ in the storing part 270.

Step 1113) The control part 230 adds $(e_1, e_2)$ to $C_U$ in the storing part 270.

Step 1114) The control part 230 sends $(e_1, e_2)$ to the control part 210 to notify of a normal end.

Step 1115) The control part 210 verifies that following formulas are satisfied. If the verification fails, the process is interrupted and the control part 230 notifies the control part 110 in the issuer apparatus 100 of the process interruption.

$$e_1 = H(m) \quad (5)$$

$$e_2 \cdot I_u \quad (6)$$

The formulas (5) and (6) mean verification that the sent token corresponds to the subject digital ticket and was issued by a proper issuer. According to the verification, it is verified that the issued ticket is valid.

(2) Transferring a Digital Ticket

The digital ticket transferring process from the user apparatus 200a to the user apparatus 200b via the connection apparatus 400 will be described in the following.

Figure 18:
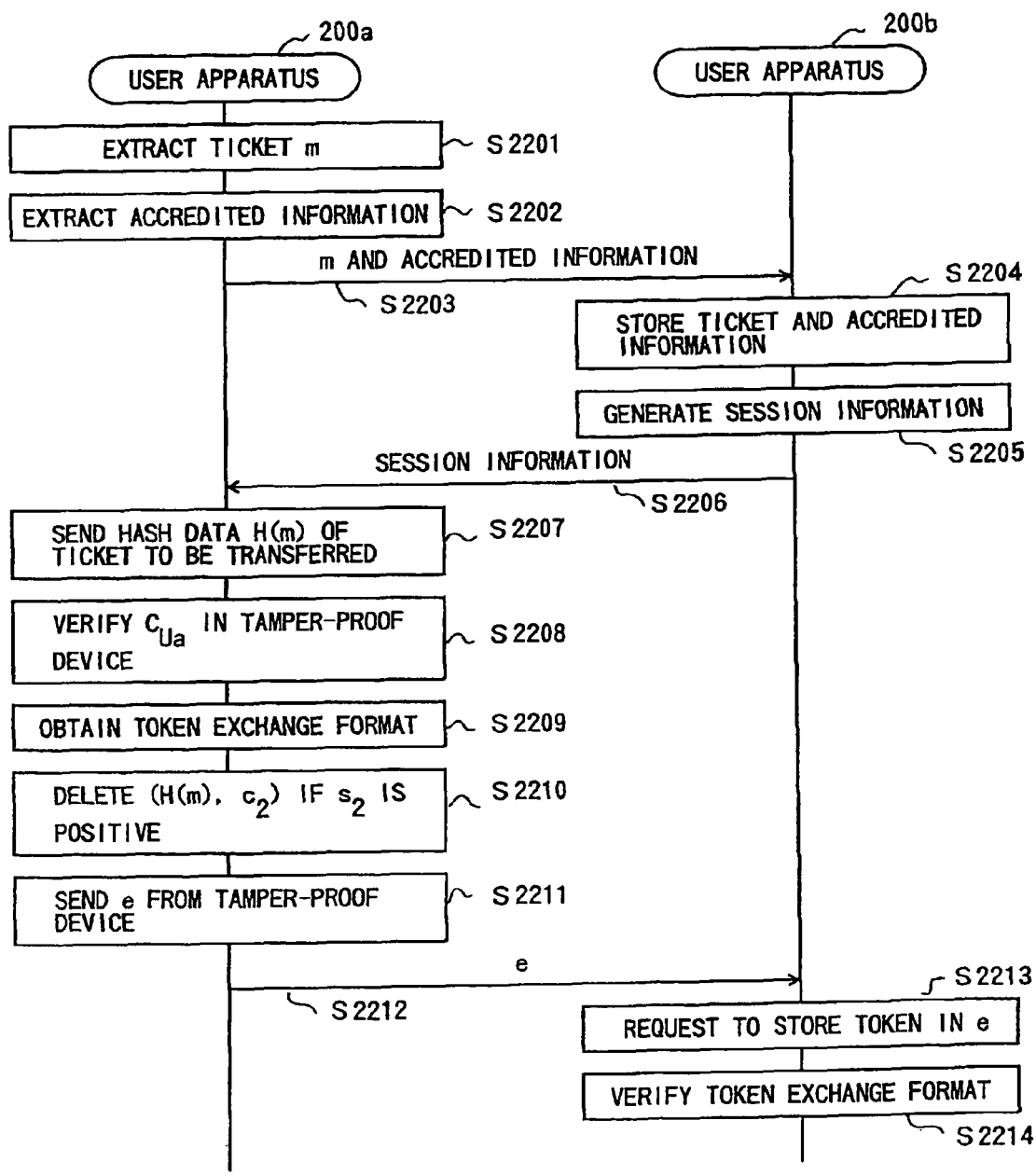
FIG. 18 is a sequence chart showing a ticket transferring process in the original data circulation system according to the second embodiment of the present invention.
Figure 19:
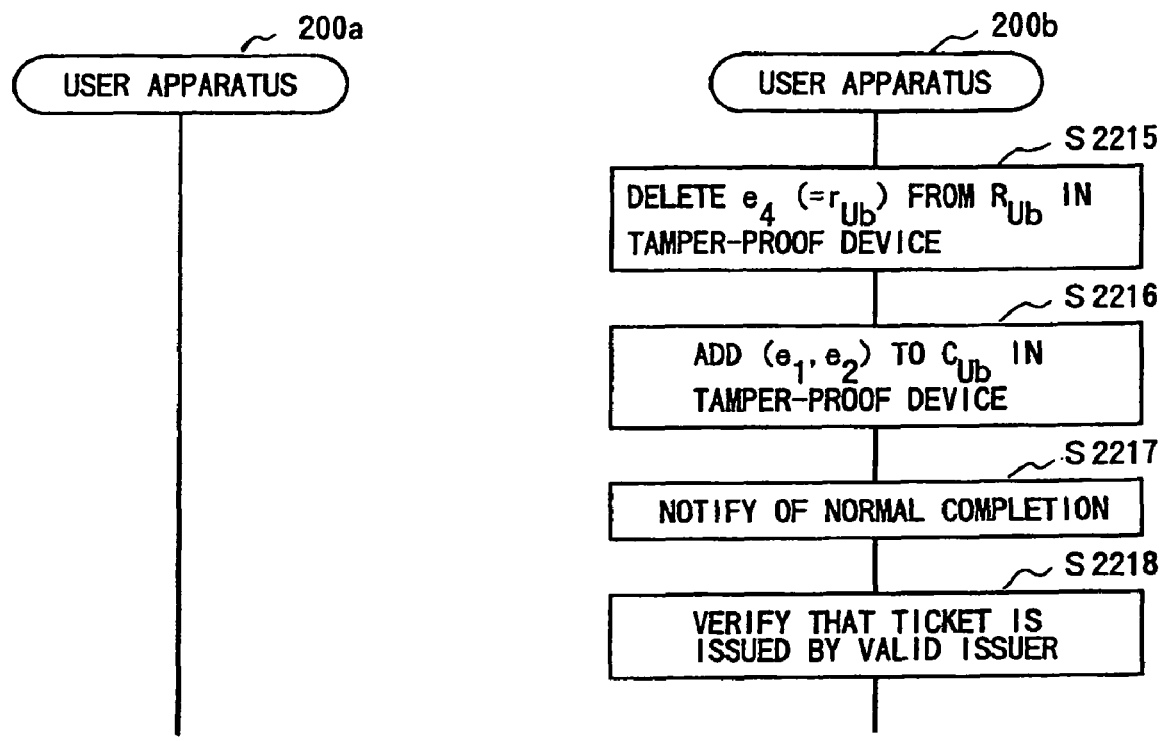
FIG. 19 is a sequence chart showing a ticket transferring process in the original data circulation system according to the second embodiment of the present invention.

FIG. 18 and FIG. 19 are sequence charts showing the digital ticket transferring process according to an embodiment of the present invention. In the figures, the connection apparatus 400 existing between the two user apparatuses 200a and 200b is not shown. "a" is added to the name of each element of the user apparatus 200a and "b" is added to the name of each element of the user apparatus 200b.

Step 2201) The control part 210a extracts the digital ticket m which is an object to be transferred from a set $M_{Ua}$ retained by the storing part 220a.

Step 2202) The control part 210a of the user apparatus 200a extracts the accredited information $(t_1, t_2, t_3)$ generated by the issuer of m from $T_{Ua}$ included in the storing part 220a.

Step 2203) The control part 210a sends m and $(t_1, t_2, t_3)$ to the control part 210b of the user apparatus 200b.

Step 2204) The control part 210b stores m in a set $M_{Ub}$ in the storing part 220b and stores $(t_1, t_2, t_3)$ in an accredited information set $T_{Ub}$ in the storing part 220b.

Step 2205) The control part 210b requests to generate session information $(s_1, s_2)$ to the control part 230b in the tamper-proof device 280b.

The control part 230b generates the session information $(s_1, s_2)$ according to the following procedure and sends it to the control part 210b.

(a) The control part 230b obtains a number rub generated by the number generation part 260b in the tamper-proof device 280b.

(b) The number $r_{Ub}$ is added to a number set $R_{Ub}$ in the storing part 270b in the tamper-proof device 280b.

(c) The session information $(s_1, s_2)=(H(PkUb), r_{Ub})$ is generated. Here, $P_{kUb}$ is a verification key held by the control part 210b.

Step 2206) The control part 210b sends the session information $(s_1, s_2)$ to the control part 210a of the user apparatus 200. In addition, issuer information $I_{Ub}$ may be sent with the session information $(s_3, s_2)$. By providing notification of the issuer information beforehand, generating and sending a token exchange format which does not satisfy formula (16) or (26) can be prevented.

Step 2207) The control part 210a sends ($s_1$, $s_2$) and a hash value H(m) of the digital ticket to be transferred to the control part 230a.

Step 2208) The control part 230a in the tamper-proof device 280a verifies that following formulas are satisfied for $C_{Ua}$ which is stored in the storing part 270a.

$$\cdot c_2((H(m),c_2) \cdot C_{Ua}), c_2 \cdot I_{Ub} \tag{7}$$

When and if the verification fails, the process after that is interrupted and the control part 210a is notified of the failure.

The above formula (7) means verification that the token (H(m), $c_2$) which corresponds to the digital ticket m to be transferred is stored in the storing part 270a.

Step 2209) The control part 230a of the tamper-proof device 280a obtains a token exchange format e=($e_1, e_2, e_3, e_4, e_5, e_6, e_7, e_8$) by using $S_{PkUa}$ which is included in the signature part 250a and verification keys PkUa, PkAa, and a key certificate (PkUa, $S_{PkAa}$(PkUa)) which is included in the control part 210a of the user apparatus 200a. Each element of e is shown below.

$$e_1 = H(m)$$

$$e_2 = c_2$$

$$e_3 = s_1$$

$$e_4 = s_2$$

$$e_5 = S_{PkUa}(H(m) \cdot c_2 \cdot s_1 \cdot s_2)$$

$$e_6 = PkUa$$

$$e_7 = S_{PkAa}(PkUa)$$

$$e_8 = PkAa$$

Step 2210) The control part 230a deletes (H(m), $c_2$) from the set $C_{Ua}$ if $s_2$ is positive.

Step 2211) The control part 230a sends e to the control part 210a.

Step 2212) The control part 210a sends e to the control part 210b of the user apparatus 200b.

Step 2213) The control part 210b sends e and the accredited information t to the control part 230b in the tamper-proof device 280b. The control part 210b requests to store the token in e.

Step 2214) The control part 230b verifies that all formulas below are satisfied by using the an authentication part 240b. If the verification fails, the process is interrupted and the control part 210b is notified of the interruption.

$$e_3 = H(PkUb) \tag{8}$$

$$e_4 \cdot R_{Ub} \tag{9}$$

$$V_{e6}(e_1 \cdot e_2 \cdot e_3 \cdot e_4, e_5) = . \tag{10}$$

$$V_{e8}(e_6, e_7) = . \tag{11}$$

$$H(e_8) \cdot t_1 \tag{12}$$

$$V_{t3}(t_1, t_2) = \tag{13}$$

$$e_2 = H(t_3) \tag{14}$$

The above formulas (8) and (9) mean verification of validity of the session information. According to the verification, fraud such as storing a token exchange format in a user apparatus other than the user apparatus 200b, reproducing a token by reusing the token exchange format or the like is prevented.

The formula (10) means verification for the validity of the signer of the token exchange format. According to this verification, tampering of the token exchange format can be prevented.

The formula (11) means verification of the key certificate of the signer. The formula (12) means verification that the signer of the key certificate is included in the accredited objects in the accredited information. The formula (13) means verification of the validity of the accredited information. The formula (14) means verification that the signer of the accredited information is the same as the issuer of the token. According to the above verification, it is verified that the tamper-proof capability of the source of the token exchange format is assured by a party trusted by the issuer.

Step 2215) The control part 230b deletes $e_4$ (=$r_{Ub}$) from the number set $R_{Ub}$ in the storing part 270b.

Step 2216) The control part 230b adds ($e_1, e_2$) to the set $C_{Ub}$ in the storing part 270b.

Step 2217) The control part 230b notifies the control part 210b of the normal completion of the process.

Step 2218) The control part 210b verifies that all formulas below are satisfied. If the verification fails, the process is interrupted and the control part 210a is notified of the interruption. If the verification succeeds, the control part 210a is notified of the normal completion of the process.

$$e_1 = H(m) \tag{15}$$

$$e_2 \cdot I_{Ub} \tag{16}$$

The formulas (15) and (16) mean verification that the sent token corresponds to the subject digital ticket and was issued by a proper issuer. According to the verification, it is verified that the transferred ticket is valid.

When the issuer information is managed data by data in the control part 210b, $e_2 \cdot I_{Ub}$ (m) is substituted for the formula (16).

(3) Consuming the Digital Ticket

The digital ticket consuming process from the user apparatus 200 to the collector apparatus 300 via the connection apparatus 400 will be described in the following.

Figure 20:
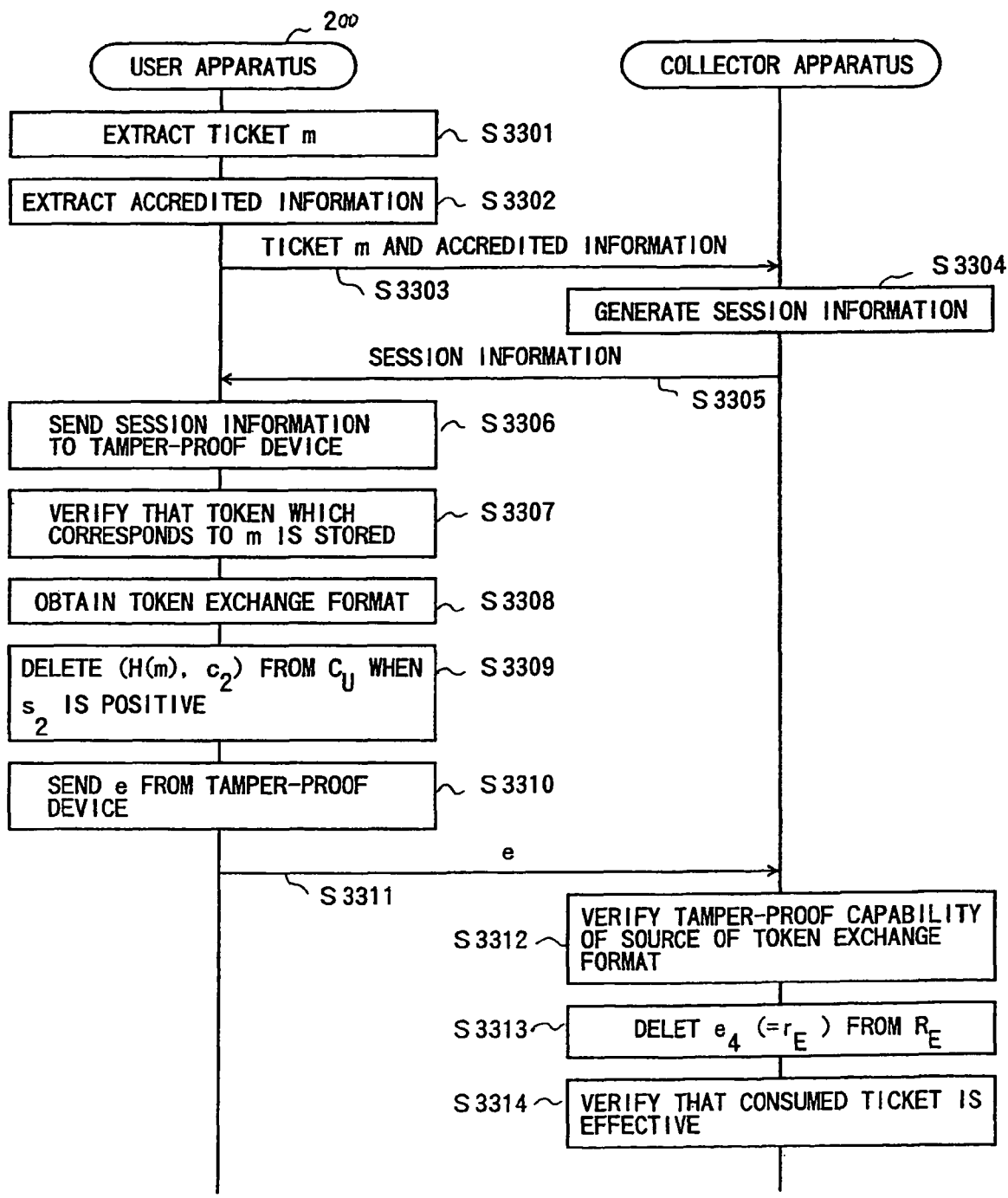
FIG. 20 is a sequence chart showing a ticket consuming process in the original data circulation system according to the second embodiment of the present invention.

FIG. 20 is a sequence chart of the ticket consuming process according to an embodiment of the present invention. In the figure, the connection apparatus 400 existing between the user apparatus 200 and the collector apparatus 300 is not shown.

Step 3301) The control part 210 extracts a digital ticket m to be consumed from $M_U$ which is included in the storing part 220.

Step 3302) The control part 210 extracts the accredited information ($t_1, t_2, t_3$) generated by the issuer of m from $T_U$ included in the storing part 220.

Step 3303) The control part 210 sends m and ($t_1, t_2, t_3$) to the control part 310 of the issuer apparatus 300.

Step 3304) The control part 310 generates session information ($s_1, s_2$) according to the following procedure.

(a) The control part 310 obtains a number $r_E$ from the number generation part 330.

(b) The number $r_E$ is added to a number set $R_E$ in the storing part 340.

(c) The session information ($s_1, s_2$)=(H(PkE), $r_E$) is generated. Here, PkE is a verification key held by the control part 310.

Step 3305) The control part 310 sends the session information $(s_1, s_2)$ to the control part 210 of the user apparatus 200.

Step 3306) The control part 210 sends $(s_1, s_2)$ and a hash value H(m) of the digital ticket to be consumed to the control part 230 of the tamper-proof apparatus 280.

Step 3307) The control part 230 verifies that following formulas are satisfied for $C_U$ which is stored in the storing part 270.

$$\cdot c_2((H(m), c_2) \cdot C_U. \tag{17}$$

When and if the verification fails, the process after that is interrupted and the control part 210 is notified of the failure.

The above formula (17) means verification that the token (H(m), $c_2$) which corresponds to the digital ticket m to be consumed is stored in the storing part 270 of the tamper-proof device 280.

Step 3308) The control part 230 obtains a token exchange format e=($e_1, e_2, e_3, e_4, e_5, e_6, e_7, e_8$) by using the signature function $S_{PkU}$ which is included in the signature part 250 and verification keys PkU, PkA, and a key certificate(PkU, $S_{PkA}$(PkU)) which are included in the control part 210. Each element of e is shown below.

$$e_1 = H(m)$$

$$e_2 = c_2$$

$$e_3 = s_1$$

$$e_4 = s_2$$

$$e_5 = S_{PkU}(H(m) \cdot c_2 \cdot s_1 \cdot s_2)$$

$$e_6 = PkU$$

$$e_7 = S_{PkA}(PkU)$$

$$e_8 = PkA$$

Step 3309) The control part 230 of the tamper-proof device 280 deletes (H(m), $c_2$) from $C_U$ when $s_2$ is positive.

Step 3310) The control part 230 sends e to the control part 210.

Step 3311) The control part 210 sends e to the control part 310 of the collector apparatus 300.

Step 3312) The control part 310 verifies that all formulas below are satisfied by using the authentication part 320. If the verification fails, the process is interrupted and the control part 210 of the user apparatus 200 is notified of the interruption.

$$e_3 = H(PkE) \tag{18}$$

$$e_4 \cdot R_E \tag{19}$$

$$V_{e6}(e_1 \cdot e_2 \cdot e_3 \cdot e_4, e_5) = \tag{20}$$

$$V_{e8}(e_6, e_7) = \tag{21}$$

$$H(e_8) \cdot t_1 \tag{22}$$

$$V_{t3}(t_1, t_2) = \tag{23}$$

$$e_2 = H(t_3) \tag{24}$$

The above formulas (18) and (19) mean verification of validity of the session information. According to the verification, fraud such as storing a token exchange format to a collector apparatus other than the collector apparatus 300, reproducing a token by reusing the token exchange format or the like is prevented.

The formula (20) means verification for the validity of the signer of the token exchange format. According to this verification, tampering of the token exchange format can be prevented.

The formula (21) means verification of the key certificate of the signer. The formula (22) means verification that the signer of the key certificate is included in the accredited objects in the accredited information. The formula (23) means verification of the validity of the accredited information. The formula (24) means verification that the signer of the accredited information is the same as the issuer of the token. According to the above verification, it is verified that the tamper-proof capability of the source of the token exchange format is assured by a party trusted by the issuer.

Step 3313) The control part 310 of the collector apparatus 300 deletes $e_4$ (=$r_E$) from $R_E$ in the storing part 340.

Step 3314) The control part 310 verifies that all formulas below are satisfied. If the verification fails, the control part 210 of the user apparatus 200 is notified of the process interruption. If the verification succeeds, a service corresponding to m is provided to the consumer.

$$e_1 = H(m) \tag{25}$$

$$e_2 \cdot I_E \tag{26}$$

The formulas (25) and (26) means verification that the sent token corresponds to the subject digital ticket and was issued by a proper issuer. According to the verification, it is verified that the consumed ticket is valid.

When the issuer information is managed data by data in the control part 310, $e_2 \cdot I_E$ (m) is substituted for the formula (26).

(4) Presenting the Digital Ticket

Presentation of the digital ticket can be realized by modifying the process of the ticket consumption as follows.

The control part 310 generates $(s_1, s_2)$=(H(PkE), $-r_E$) in (c) of the step 3304.

A formula $-e_4 \cdot R_E$ is substituted for the formula (19) in the step 3312.

According to the above-mentioned modification, since $s_2$ becomes negative, (H(m), $c_2$) is not deleted from $C_U$ in step 3309. That is, it becomes possible to verify that the user apparatus has a valid digital ticket at the time of the presentation while the valid digital ticket remains in the user apparatus. Thus, the inspection of the digital tickets becomes possible.

In the above descriptions (1)-(4), the sent token exchange format is not explicitly stored. On the other hand, storing the token exchange format in the storing part 220 produces an effect. That is, the user apparatus can send the history of the token exchange format when sending m. As a result, it becomes possible to identify a fraudulent apparatus when fraud (double spending) is found. The fraud may be, for example, that the tamper-proof device 28 is cracked.

(5) Returning the Digital Ticket

The collector can return the digital ticket which has been consumed or presented to the issuer. Then, the issuer can pay a value to the collector. Accordingly, a value such as a fee can be paid to the issuer who has collected or inspected a digital ticket while preventing double-billing.

In the following, the process for returning will be described.

The issuer apparatus 100 further includes a part (a storing part 160) for storing the token exchange format e and a part for storing or obtaining data m corresponding to the returned ticket and accredited information ($t_1, t_2, t_3$).

The process for returning the digital ticket which is consumed or presented at the issuer apparatus 300 will be describe.

Step 5501) The issuer apparatus 300 sends the token exchange format e which is consumed or presented to the issuer apparatus 100.

Step 5502) The control part 100 of the issuer apparatus 100 verifies that a formula $e_2=H(PkI)$ is satisfied in which $e_2$ is included in e. When and if the verification fails, the issuer apparatus is notified of the failure and the process is interrupted. According to the verification, it is verified that e corresponds to the digital ticket which is issued by the issuer apparatus 100 itself.

Step 5503) The control part 110 verifies that the formulas (20)-(22) are satisfied for e. When the accredited information $(t_1, t_2, t_3)$ is obtained via an unreliable route (for example, via the issuer), the formulas (23) and (24) are also verified. In this case, when verifying the formula (24), PkI is substituted for $t_3$. When the verification fails, the issuer apparatus 300 is notified of the failure and the process is interrupted. According to the verification, it is verified that e is circulated via a valid circulation route.

Step 5504) The control part 110 verifies that the tamper-proof capability of $e_3$ is not assured by any third party which is trusted by $t_1$ in which $e_3$ is included in e when $e_4$ is positive. Accordingly, it is verified that the valid token is not stored, that is, the right of the ticket is properly terminated due to consumption.

Step 5505) The control part 110 stores e in the storing part 160. If e has been already stored in the storing part 160, the issuer apparatus 300 is notified of the failure and the process is interrupted.

Step 5506) The issuer provides a value according to the returned digital ticket to the issuer.

(6) Book of Tickets

A book of tickets can be realized by adding number information or time information to the token of the token exchange format. The number information is assumed to be the number of the ticket.

Accordingly, when a plurality of digital tickets issued by the same issuer and having the same contents are issued, the digital tickets can be treated properly and a plurality of same tokens can be sent effectively.

Specifically, by modifying the above-mentioned embodiments, the book of tickets can be realized.

Number information $C_3$ is added to the token.

Number information $e_n$ is added to the token exchange format.

In the process of issuing the digital ticket, the number of tickets is specified as N when the token is generated (step 1102).

In the process of transferring/consuming the digital ticket, when the step 2207 or the step 3306 is performed, the number of the digital tickets to be transferred/consumed is specified as n.

In the process of transferring/consuming the digital ticket, when it is verified that the token is stored in step 2208 or step 3307, it is verified that the number of the tickets is adequate. That is, it is verified that $C_U$ includes $(C_1, C_2, C_3)$ in which $c_1=H(m) \cdot c_3 \geq n$ is satisfied.

When the token exchange format is generated in step 1108, step 2209 or step 3308, $e_n=n$ is added and n is added and concatenated to the object to be signed in $e_5$ such that $c_1 \cdot c_2 \cdot s_1 \cdot s_2 \cdot n$ is obtained.

In the process of transferring/consuming, when deleting the token (when $s_2$ is positive in step 2210 or step 3309), $(H(m), c_2, c_3)$ is deleted from $C_U$ only when $c_3=n$ is satisfied. When $c_3<n$, $(H(m), c_2, c_3)$ in $C_U$ is updated to $(H(m), c_2, c_3-n)$.

When verifying the token exchange format in step 1111, step 2214 or step 3312, $e_n$ is added and concatenated to the object to be verified in the signature verification by $e_5$ (the formulas (3), (10) and (20)) such that $e_1 \cdot e_2 \cdot e_3 \cdot e_4 \cdot e_n$ is obtained.

In the process of issuing/transferring the digital ticket, when storing the token in step 1113 or step 2216, if $C_U$ already includes a token $(c_1, c_2, c_3)$ in which $e_1=c_1$ and $e_2=c_2$ are satisfied, the token $(c_1, c_2, c_3)$ in $C_U$ is updated to $(c_1, c_2, c_3+e_n)$.

In the process of consuming/returning the digital ticket, the service or the value may be provided a plurality of times according to $e_n$.

(7) Retransmission Control

The token can be retransmitted while preventing reproduction after abnormal conditions such as unintentional disconnection of a route are encountered. In the following, the process for the retransmission will be described. Specifically, the following procedures are added to some steps in the above-mentioned embodiments.

The control part 110 or 230 retains the token exchange format e generated in step 1108, step 2209 or step 3308.

The control part 210 or 310 notifies the control part 110 or 210 which sent the digital ticket of $(s_1, s_2)$ when acknowledgment of receipt is sent in normal completion in step 1115, step 2218, or in providing a service in step 3314.

The control part 110, 210 deletes the token exchange format corresponding to $(s_1, s_2)$ after the acknowledgment of receipt is received.

When carrying out retransmission, some steps of the above-mentioned embodiment are modified as shown below.

When the session information is obtained in step 1106, 2205 or 3304, the session information is not newly generated. Instead, the session information $(s_1, s_2)$ stored in the storing part 220 or 340 is used.

In step 1108, steps 2208-2210, and steps 3307-3309, if the control part 110 or 210 has e in which $(e_3=s_1) \cdot (e_4=s_2)$ is satisfied, e is not newly generated and the retained e is used.

(8) Variations of Issuing

Since the issue of the digital ticket can be assumed to be ticket (token) generation and transferring the ticket logically, the digital ticket can be issued by using the ticket transferring process described below for example. The amount of processing necessary for the process increases as compared with the ticket issuing process described above, since the verification process of the ticket transferring is more complex than that of the ticket issuing.

(8-1) Use of Self-Certificate

According to the after mentioned process, the verification process of the token exchange format by the control part 230 is different between ticket issuing (step 1111) and ticket transferring (step 2214). Implementation cost can be decreased by unifying the verification process as one in step 2214.

The control part 110 includes a key certificate (PkI, $S_{PkI}$ (PkI)) by itself. As described below, by modifying the ticket issuing process, the process of the control part 230 which is in the receiving side can be unified.

The issuer apparatus includes the self hash value H(PkI) in the accredited object $t_1$ by the issuer when the accredited information generation part 150 generates the accredited information in step 1103.

$e_7=S_{PkI}$ (PkI) and $e_8=PkI$ are used when the token exchange format e is generated in step 1108.

The formulas (8)-(14) are used instead of the formulas (1)-(4) when the token exchange format e is verified in step 1111. U is substituted for Ub.

(8-2) Issuing the Digital Ticket by a User Apparatus

As mentioned below, the user apparatus can issue the digital ticket by having a capability of generating a token issued by the user apparatus.

The process will be described in the following. In the description, it is assumed that data m is already generated.

The control part 210 provides a hash value H(m) of data m which corresponds to the digital ticket and the accredited object $t_1=\{H(PkA_1), H(PkA_2), \ldots, H(PkA_i)\}$ to the control part 230.

The control part 230 stores (H(m), H(PkU)) in the storing part 270 by using the verification key PkU.

The control part 230 generates $t_2=S_{PkU}(H(PkA_1), H(PkA_2), \ldots H(PkA_i))$ by using the signature part 250.

The control part 230 returns $(t_1, t_2, t_3=PkU)$ to the control part 210. The control part 210 stores $(t_1, t_2, t_3)$ in the storing part 220. After that, the digital ticket is sent.

The above-mentioned examples of returning the tickets, the book of the tickets, retransmission control, and variations of issuing can be applied to the first embodiment.

Each element of the issuer apparatus 100, the user apparatus 200 or the collector apparatus 300 can be constructed by a program. The program can be stored in a disk unit connected to a computer which may be used as the issuer apparatus, the user apparatus or the collector apparatus. The program can be also stored in a transportable computer readable medium such as a floppy disk, a CD-ROM or the like. The program may be installed from the computer readable medium to a computer such that the present invention is realized by the computer.

Figure 21:
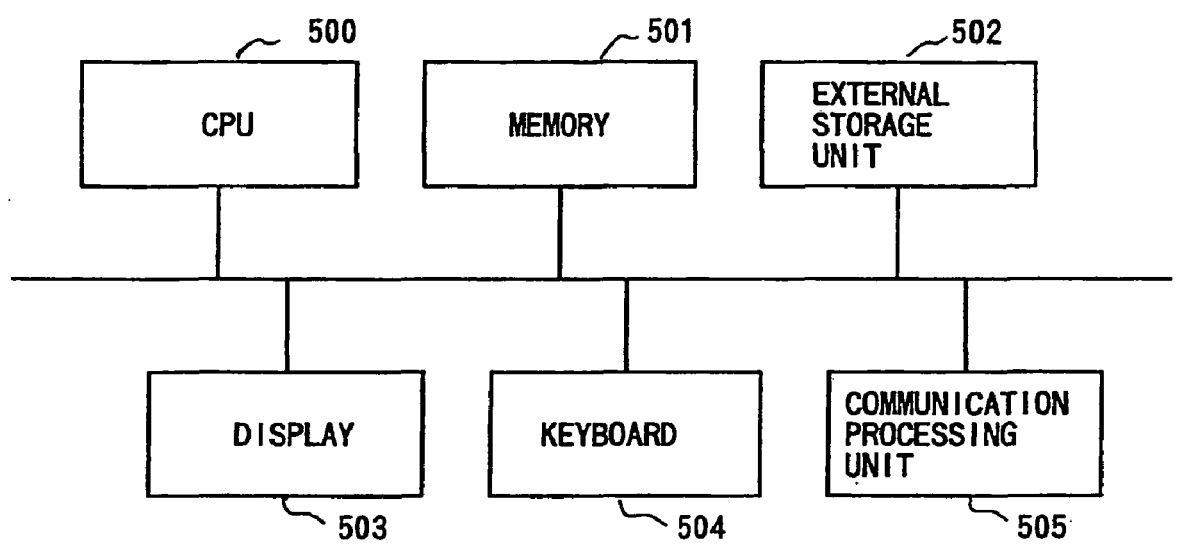
FIG. 21 is a block diagram showing a configuration of a computer.

FIG. 21 is a block diagram showing a hardware configuration of such a computer. As shown in FIG. 21, the computer system includes a CPU 500 by which a process of a program is executed, a memory 501 for temporarily storing data and a program, an external storage unit 502 for storing data and a program to be loaded into the memory 501, a display 503 for displaying data, a keyboard 504 for inputting data or commands, and a communication processing unit 505 which enables the computer system to communicate with other computers via a network. The program is installed in the external storage unit 502 then loaded into memory 501 and executed by the CPU 500.

As mentioned above, according to the second embodiment of the present invention, the token can be transmitted only via routes which are trusted by the issuer and the user or the collector identified by the issuer. Thus, the occurrence of the token corresponding to the data being newly stored in the token storing part by a person other than the issuer indicated by the token issuer information in the token can be prevented. In addition, the occurrence of the token being reproduced to a plurality of the token storing parts while the token is transferred can be prevented.

In addition, by regarding data with the token issued by a specific issuer as original, it becomes possible to restrict the number issuances of the original data by the issuer.

Further, by using an information identifier such as an URL which exists in an network as data, an is access right of the information which can not be reproduced and can be transferred can be provided.

Further, by using a ticket with the correct contents or by using an identifier of the ticket, only the ticket that has a valid token can be regarded as a valid ticket and a user or a collector can refuse a ticket other than the valid ticket. Thus, fraudulent use (for example, double spending and illegal reproduction) of the ticket can be prevented.

Furthermore, by using a program as data of the present invention and by using the token issued by a specific issuer as a license of the program, illegal copying and use of the program can be prevented. In this case, the program execution apparatus can refuse to execute a program other than the program with the token.

Further, by using music data or image data as data of the present invention, illegal copying and use of the music data or image data, in which the token issued by a specific issuer is used as an appreciation right can be prevented. A display apparatus of the data or a playback apparatus can refuse to display or playback data other than the data with the token.

The present invention is not limited to the specifically disclosed embodiments, and variations and modifications may be made without departing from the scope of the invention.

What is claimed is:

1. A collector apparatus for exercising a right of digital information which has a value that is issued by an issuer apparatus, the collector apparatus comprising:
    a unit configured to receive, from a user apparatus, the digital information with a signature of the issuer apparatus and accreditation information with the signature, wherein the accreditation information includes information corresponding to verification keys that correspond to third parties that are trusted by the issuer apparatus and that assure tamper-proof capability of the user apparatus;
    a unit configured to generate unique session information and to send the session information to the user apparatus;
    a unit configured to receive information including a manifest corresponding to the digital information, the session information, and a verification key that corresponds to a third party from the user apparatus; and
    a unit configured to verify the session information, and the manifest, and to verify whether information corresponding to the verification key received from the user apparatus is included in the accreditation information in order to verify that tamper-proof capability of the user apparatus is assured by a third party that is trusted by the issuer apparatus.

2. A computer readable medium storing program code for causing a computer to exercise a right of digital information which has a value issued by an issuer apparatus, the computer being used as a collector apparatus, the computer readable medium comprising:
    program code configured to receive, from a user apparatus, the digital information with a signature of the issuer apparatus and accreditation information with the signature, wherein the accreditation information includes information corresponding to verification keys that correspond to third parties that are trusted by the issuer apparatus and that assure tamper-proof capability of the user apparatus;
    program code configured to generate unique session information and to send the session information to the user apparatus;
    program code configured to receive information including a manifest corresponding to the digital information, the session information, and a verification key that corresponds to a third party from the user apparatus; and
    program code configured to verify the session information, and the manifest and to verify whether information corresponding to the verification key received from the user apparatus is included in the accreditation information in order to verify that tamper-proof capability of the user apparatus is assured by a third party that is trusted by the issuer apparatus.

* * * * *